US012435315B2

(12) United States Patent
Jensen et al.

(10) Patent No.: US 12,435,315 B2
(45) Date of Patent: Oct. 7, 2025

(54) GENERATING DORSAL FOREGUT, AND ANTERIOR DOMAIN, ENDODERM CELLS

(71) Applicant: The Cleveland Clinic Foundation, Cleveland, OH (US)

(72) Inventors: Jan Jensen, Cleveland, OH (US); Michael A. Bukys, Cleveland, OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 872 days.

(21) Appl. No.: 17/609,954

(22) PCT Filed: May 22, 2020

(86) PCT No.: PCT/US2020/034201
§ 371 (c)(1),
(2) Date: Nov. 9, 2021

(87) PCT Pub. No.: WO2020/237141
PCT Pub. Date: Nov. 26, 2020

(65) Prior Publication Data
US 2022/0220447 A1 Jul. 14, 2022

Related U.S. Application Data

(60) Provisional application No. 62/851,348, filed on May 22, 2019.

(51) Int. Cl.
*C12N 5/071* (2010.01)
*C07K 14/51* (2006.01)
*A61K 38/00* (2006.01)

(52) U.S. Cl.
CPC ............ *C12N 5/0678* (2013.01); *C07K 14/51* (2013.01); *A61K 38/00* (2013.01); *C12N 2501/155* (2013.01); *C12N 2501/385* (2013.01); *C12N 2506/02* (2013.01); *C12N 2506/45* (2013.01)

(58) Field of Classification Search
None
See application file for complete search history.

(56) References Cited

U.S. PATENT DOCUMENTS

| | | | |
|---|---|---|---|
| 8,785,185 B2 | 7/2014 | Xu et al. | |
| 10,190,096 B2 | 1/2019 | Melton et al. | |
| 2013/0022986 A1 | 1/2013 | Hosoya et al. | |
| 2014/0329315 A1 | 11/2014 | Odorico et al. | |
| 2015/0329821 A1* | 11/2015 | Ang | C12N 5/0603 435/366 |
| 2015/0368616 A1* | 12/2015 | Jensen | A61K 35/39 424/499 |
| 2016/0002595 A1 | 1/2016 | Keller et al. | |
| 2016/0159140 A1 | 6/2016 | Haydt, III et al. | |
| 2016/0168535 A1 | 6/2016 | Snoeck et al. | |
| 2017/0327793 A1 | 11/2017 | Xu | |
| 2018/0055890 A1 | 3/2018 | Kieffer et al. | |
| 2018/0153941 A1 | 6/2018 | Melton et al. | |
| 2018/0214553 A1 | 8/2018 | Berenson | |
| 2018/0216076 A1 | 8/2018 | Hebrok et al. | |
| 2018/0362924 A9 | 12/2018 | Chambers et al. | |
| 2019/0071314 A1 | 3/2019 | Min et al. | |
| 2019/0111086 A1 | 4/2019 | Keller et al. | |

FOREIGN PATENT DOCUMENTS

| | | | |
|---|---|---|---|
| CN | 101351547 A | 1/2009 | |
| CN | 104755607 A | 7/2015 | |
| CN | 105793414 A | 7/2016 | |
| CN | 107435038 A | 12/2017 | |
| JP | 2016/515825 | 6/2016 | |
| WO | WO 2011/081222 | 7/2011 | |
| WO | WO 2017/048193 | 3/2017 | |
| WO | WO 2019/018818 | 1/2019 | |
| WO | WO-2019018818 A1 * | 1/2019 | ............ A61K 35/39 |
| WO | WO 2019/053727 | 3/2019 | |
| WO | WO 2019/074793 | 4/2019 | |

OTHER PUBLICATIONS

International Search Report and Written Opinion for PCT/US2020/034201. Mailed Sep. 2, 2020. 18 Pages.
A Safety, Tolerability, and Efficacy Study of VC-02™ Combination Product in Subjects With Type 1 Diabetes Mellitus and Hypoglycemia Unawareness. ClinicalTrials.gov Identifier:NCT03163511. First Posted: May 23, 2017. Retrieved from https://clinicaltrials.gov/ct2/show/NCT03163511 on Feb. 9, 2022. 7 pages.
Adewola et la., Microfluidic perifusion and imaging device for multi-parametric islet function assessment. Biomed Microdevices. Jun. 2010;12(3):409-17.
Afelik et al., Notch-mediated patterning and cell fate allocation of pancreatic progenitor cells. Development. May 2012;139(10):1744-53.
An et al., Designing a retrievable and scalable cell encapsulation device for potential treatment of type 1 diabetes. Proc Natl Acad Sci U S A. Jan. 9, 2018;115(2):E263-E272.

(Continued)

*Primary Examiner* — Nghi V Nguyen
(74) *Attorney, Agent, or Firm* — Jason R. Bond; Casimir Jones, S.C.

(57) ABSTRACT

Provided herein are compositions, systems, kits, and methods for generating dorsal foregut endoderm (DFE) cells by contacting pluripotent stem cells with a retinoic acid signaling pathway agonist and a bone morphogenetic (BMP) pathway inhibitor without exposing the stem cells to a transforming growth factor beta (TGFβ) pathway agonist. In certain embodiments, the DFE cells are contacted with a retinoic acid signaling pathway agonist and a FGFR pathway inhibitor to generate pancreatic endoderm (PE) cells (e.g., with dorsal identity). In other embodiments, the PE cells are contacted with an ALK5 inhibitor and a Notch inhibitor to generate endocrine cells (e.g., insulin expressing endocrine cells). In certain embodiments, compositions, systems, kits, and methods are provided for generating anterior domain endoderm (ADE) cells.

20 Claims, 30 Drawing Sheets

(56) References Cited

OTHER PUBLICATIONS

An Open Label, Pilot Investigation, to Assess the Safety and Efficacy of Transplantation of Macro-encapsulated Human Islets Within the Bioartificial Pancreas Beta-Air in Patients With Type 1 Diabetes Mellitus. ClinicalTrials.gov Identifier: NCT02064309. First Posted: Feb. 17, 2014. Retrieved from: https://clinicaltrials.gov/ct2/show/NCT02064309 on Feb. 9, 2022. 7 pages.

Angelo et al., A fate map of the murine pancreas buds reveals a multipotent ventral foregut organ progenitor. PLoS One. 2012;7(7):e40707. 11 pages.

Body-Bechou et al., TCF2/HNF-1beta mutations: 3 cases of fetal severe pancreatic agenesis or hypoplasia and multicystic renal dysplasia. Prenat Diagn. Jan. 2014;34(1):90-3.

Bort et al., Hex homeobox gene-dependent tissue positioning is required for organogenesis of the ventral pancreas. Development. Feb. 2004;131(4):797-806.

Carinhas et al., Systems biotechnology of animal cells: the road to prediction. Trends Biotechnol. Jul. 2012;30(7):377-85.

Chakrabarty et al., Model-based design of experiments for cellular processes. Wiley Interdiscip Rev Syst Biol Med. Mar.-Apr. 2013;5(2):181-203.

Chen et al., Functional evaluation of ES cell-derived endodermal populations reveals differences between Nodal and Activin A-guided differentiation. Development. Feb. 1, 2013;140(3):675-86.

Cheng et al., Self-renewing endodermal progenitor lines generated from human pluripotent stem cells. Cell Stem Cell. Apr. 6, 2012;10(4):371-84.

Cho et al., Inhibition of activin/nodal signalling is necessary for pancreatic differentiaion of human pluripotent stem cells. Diabetologia, Sep. 26, 2012, vol. 55, No. 12, pp. 3284-3295.

Chung et al., Bmp2 signaling regulates the hepatic versus pancreatic fate decision. Dev Cell. Nov. 2008;15(5):738-48.

D'Amour et al., Efficient differentiation of human embryonic stem cells to definitive endoderm. Nat Biotechnol. Dec. 2005;23(12):1534-41.

Davenport et al., Anterior-Posterior Patterning of Definitive Endoderm Generated from Human Embryonic Stem Cells Depends on the Differential Signaling of Retinoic Acid, Wnt-, and BMP-Signaling. Stem Cells. Nov. 2016;34(11):2635-2647.

De Vas et al., Hnf1b controls pancreas morphogenesis and the generation of Ngn3+ endocrine progenitors. Development. Mar. 1, 2015;142(5):871-82.

Deutsch et al., A bipotential precursor population for pancreas and liver within the embryonic endoderm. Development. Mar. 2001;128(6):871-81.

Gadue et al., Wnt and TGF-beta signaling are required for the induction of an in vitro model of primitive streak formation using embryonic stem cells. Proc Natl Acad Sci U S A. Nov. 7, 2006;103(45):16806-11.

Gerin et al., Modeling the dependence of respiration and photosynthesis upon light, acetate, carbon dioxide, nitrate and ammonium in Chlamydomonas reinhardtii using design of experiments and multiple regression. BMC Syst Biol. Aug. 1, 20146;8:96.

Green et al., Generation of anterior foregut endoderm from human embryonic and induced pluripotent stem cells. Nat Biotechnol. Mar. 2011;29(3):267-72.

Haumaitre et al., Lack of TCF2/vHNF1 in mice leads to pancreas agenesis. Proc Natl Acad Sci U S A. Feb. 1, 2005;102(5):1490-5.

Hebrok et al., Notochord repression of endodermal Sonic hedgehog permits pancreas development. Genes Dev. Jun. 1, 1998;12(11):1705-13.

Hrvatin et al., Differentiated human stem cells resemble fetal, not adult, β cells. Proc Natl Acad Sci U S A. Feb. 25, 2014;111(8):3038-43.

Hwa et al., Transplantation of Macroencapsulated Insulin-Producing Cells. Curr Diab Rep. Jun. 16, 2018;18(8):50.

Jennings et al., Laser Capture and Deep Sequencing Reveals the Transcriptomic Programmes Regulating the Onset of Pancreas and Liver Differentiation in Human Embryos. Stem Cell Reports. Nov. 14, 2017;9(5):1387-1394.

Jensen et al., Independent development of pancreatic alpha- and beta-cells from neurogenin3-expressing precursors: a role for the notch pathway in repression of premature differentiation. Diabetes. Feb. 2000;49(2):163-76.

Kimura et al., Induction of primordial germ cell-like cells from mouse embryonic stem cells by ERK signal inhibition. Stem Cells. Oct. 2014;32(10):2668-78.

Kitano. Computational systems biology. Nature. Nov. 14, 2002;420(6912):206-10.

Kroon et al., Pancreatic endoderm derived from human embryonic stem cells generates glucose-responsive insulin-secreting cells in vivo. Nat Biotechnol. Apr. 2008;26(4):443-52.

Kumar et al., Design of experiments applications in bioprocessing: concepts and approach. Biotechnol Prog. Jan.-Feb. 2014;30(1):86-99.

Kumar et al., Signals from lateral plate mesoderm instruct endoderm toward a pancreatic fate. Dev Biol. Jul. 1, 2003;259(1):109-22.

Kwon et al., The endoderm of the mouse embryo arises by dynamic widespread intercalation of embryonic and extraembryonic lineages. Dev Cell. Oct. 2008;15(4):509-20.

Li et al., Selective agenesis of the dorsal pancreas in mice lacking homeobox gene Hlxb9. Nat Genet. Sep. 1999;23(1):67-70.

Loh et al., Efficient endoderm induction from human pluripotent stem cells by logically directing signals controlling lineage bifurcations. Cell Stem Cell. Feb. 6, 2014;14(2):237-52.

Martin et al., Dorsal pancreas agenesis in retinoic acid-deficient Raldh2 mutant mice. Dev Biol. Aug. 15, 2005;284(2):399-411.

Matsuno et al., Redefining definitive endoderm subtypes by robust induction of human induced pluripotent stem cells. Differentiation. Dec. 2016;92(5):281-290.

Matsuura et al., Conserved origin of the ventral pancreas in chicken. Mech Dev. Oct. 2009;126(10):817-27.

Mccracken et al., Modelling human development and disease in pluripotent stem-cell-derived gastric organoids. Nature. Dec. 18, 2014;516(7531):400-4.

Mcdonald et al., Gut endoderm takes flight from the wings of mesoderm. Nat Cell Biol. Dec. 2014;16(12):1128-9.

Mendes et al., Combinatorial Analysis of Growth Factors Reveals the Contribution of Bone Morphogenetic Proteins to Chondrogenic Differentiation of Human Periosteal Cells. Tissue Eng Part C Methods. May 2016;22(5):473-86.

Mercier et al., Multivariate data analysis as a PAT tool for early bioprocess development data. J Biotechnol. Sep. 10, 2013;167(3):262-70.

Mfopou et al., Noggin, retinoids, and fibroblast growth factor regulate hepatic or pancreatic fate of human embryonic stem cells. Gastroenterology. Jun. 2010;138(7):2233-45, 2245.e1-14. 27 pages.

Molotkov et al., Retinoic acid generated by Raldh2 in mesoderm is required for mouse dorsal endodermal pancreas development. Dev Dyn. Apr. 2005;232(4):950-7.

Open-label Investigation of the Safety and Effectiveness of DIABECELL® in Patients With Type 1 Diabetes Mellitus. ClinicalTrials.gov Identifier: NCT01739829. First Posted: Dec. 4, 2012. Sponsor: Diatranz Otsuka Limited. Retrieved from: https://clinicaltrials.gov/ct2/show/NCT01739829 on Feb. 9, 2022. 8 pages.

Pagliuca et al., Generation of functional human pancreatic β cells in vitro. Cell. Oct. 9, 2014;159(2):428-39.

Poll et al., A vHNF1/TCF2-HNF6 cascade regulates the transcription factor network that controls generation of pancreatic precursor cells. Diabetes. Jan. 2006;55(1):61-9.

Rathore et al., Guidance for performing multivariate data analysis of bioprocessing data: pitfalls and recommendations. Biotechnol Prog. Jul.-Aug. 2014;30(4):967-73.

Rezania et al., Reversal of diabetes with insulin-producing cells derived in vitro from human pluripotent stem cells. Nat Biotechnol. Nov. 2014;32(11):1121-33.

Roost et al., KeyGenes, a Tool to Probe Tissue Differentiation Using a Human Fetal Transcriptional Atlas. Stem Cell Reports. Jun. 9, 2015;4(6):1112-24.

(56) References Cited

OTHER PUBLICATIONS

Rottinger et al., Nodal signaling is required for mesodermal and ventral but not for dorsal fates in the indirect developing hemichordate, Ptychodera flava. Biol Open. May 15, 2015;4(7):830-42.

Russ et al., Controlled induction of human pancreatic progenitors produces functional beta-like cells in vitro. EMBO J. Jul. 2, 2015;34(13):1759-72.

Sadowski et al., Harnessing QbD, Programming Languages, and Automation for Reproducible Biology. Trends Biotechnol. Mar. 2016;34(3):214-227.

Sampaziotis et al., Cholangiocytes derived from human induced pluripotent stem cells for disease modeling and drug validation. Nat Biotechnol. Aug. 2015;33(8):845-852.

Spence et al., Directed differentiation of human pluripotent stem cells into intestinal tissue in vitro. Nature. Feb. 3, 2011;470(7332):105-9.

Spence et al., Sox17 regulates organ lineage segregation of ventral foregut progenitor cells. Dev Cell. Jul. 2009;17(1):62-74.

Swain et al., Quality by Design: Concept to Applications. Curr Drug Discov Technol. 2019;16(3):240-250.

Tesar. Derivation of germ-line-competent embryonic stem cell lines from preblastocyst mouse embryos. Proc Natl Acad Sci U S A. Jun. 7, 2005;102(23):8239-44.

Tremblay et al., Distinct populations of endoderm cells converge to generate the embryonic liver bud and ventral foregut tissues. Dev Biol. Apr. 1, 2005;280(1):87-99.

Ulven et al., Identification of endogenous retinoids, enzymes, binding proteins, and receptors during early postimplantation development in mouse: important role of retinal dehydrogenase type 2 in synthesis of all-trans-retinoic acid. Dev Biol. Apr. 15, 2000;220(2):379-91.

Wang et al., Systematic prevention of bubble formation and accumulation for long-term culture of pancreatic islet cells in microfluidic device. Biomed Microdevices. Apr. 2012;14(2):419-26.

Xie et al., Dynamic chromatin remodeling mediated by polycomb proteins orchestrates pancreatic differentiation of human embryonic stem cells. Cell Stem Cell. Feb. 7, 2013;12(2):224-37.

Bukys et al., High-Dimensional Design-Of-Experiments Extracts Small-Molecule-Only Induction Conditions for Dorsal Pancreatic Endoderm from Pluripotency. iScience. Aug. 21, 2020;23(8):101346.

Cho et al., Inhibition of activin/nodal signalling is necessary for pancreatic differentiation of human pluripotent stem cells. Diabetologia. Dec. 2012;55(12):3284-95.

Horschitz et al., Impact of preconditioning with retinoic acid during early development on morphological and functional characteristics of human induced pluripotent stem cell-derived neurons. Stem Cell Res. Jul. 2015;15(1):30-41.

Saito et al., Development of an optimized 5-stage protocol for the in vitro preparation of insulin-secreting cells from mouse ES cells. Cytotechnology. Aug. 2016;68(4):987-98.

Supplementary Partial European Search Report for EP 20809586.9, mailed Jun. 13, 2023, 15 pages.

Office Action for Canadian Application No. 3139294 dated Feb. 7, 2024 (3 pages).

Office Action for Chinese Application No. 202080050655.3 dated Nov. 6, 2023 (10 pages).

* cited by examiner

APS Optimizer

| Factor | Role | Value | Graph | Factor contribution |
|---|---|---|---|---|
| 1 BMP4 | Free | 0.00 | | 6.06 |
| 2 LDN3189 | Free | 0.02 | | 10.23 |
| 3 ACTA | Free | 49.18 | | 18.65 |
| 4 ALK5I | Free | 18.58 | | 1.47 |
| 5 WNT3 | Free | 14.55 | | 2.60 |
| 6 IWP2 | Free | 5.24 | | 18.65 |
| 7 FGF2 | Free | 0.09 | | 5.34 |
| 8 PD0325 | Free | 3.01 | | 18.57 |
| 9 SHH | Free | 0.05 | | 1.68 |
| 10 SANT1 | Free | 0.00 | | 4.48 |
| 11 RA | Free | 0.00 | | 12.16 |

HNF1β Optimizer

| Factor | Role | Value | Graph | Factor contribution |
|---|---|---|---|---|
| 1 BMP4 | Free | 0.00 | | 2.33 |
| 2 LDN3189 | Free | 250.00 | | 31.67 |
| 3 ACTA | Free | 0.00 | | 8.25 |
| 4 ALK5I | Free | 500.00 | | 7.59 |
| 5 WNT3 | Free | 50.00 | | 0.65 |
| 6 IWP2 | Free | 0.00 | | 0.42 |
| 7 FGF2 | Free | 0.00 | | 9.42 |
| 8 PD0325 | Free | 250.00 | | 4.06 |
| 9 SHH | Free | 0.00 | | 1.06 |
| 10 SANT1 | Free | 0.00 | | 4.24 |
| 11 RA | Free | 2.00 | | 30.10 |

FIG. 17

Factor Contribution
Low ▓▓▓▓▓ High

| Gene | Expression | Activin A | BMP4 | NODAL | RA | A8301 | LDN | KO2288 | ER50891 |
|---|---|---|---|---|---|---|---|---|---|
| GSC | Dorsal | 14.7031 | -3.61427 | | -13.8756 | -12.6292 | -4.06791 | | -15.367 |
| NR5A2 | Ventral Pancreas/Liver | | -2.40708 | 9.83963 | 18.4928 | | 9.58935 | -6.07877 | -3.41375 |
| EVX1 | Hindgut Marker | 18.104 | -4.16274 | 9.0972 | -27.95 | -17.9041 | -5.70733 | -5.382 | -13.7427 |
| PROX1 | Suggested Ventral | 8.11345 | 2.1695 | 8.1356 | | -14.5053 | 15.6652 | -9.37019 | -17.2384 |
| TBX1 | Anterior | | | 6.04546 | 12.9286 | 15.2503 | | -5.00788 | 4.20601 |
| SOX17 | Posterior | 6.27224 | -2.89626 | 4.26314 | -17.334 | | -16.629 | -7.27634 | |
| PAX9 | Anterior | | 0.528428 | 4.00105 | | 19.2146 | | 0.772219 | 2.08451 |
| AFP | Liver | 5.93841 | 2.06715 | 3.19924 | | 1.33648 | | -2.24098 | |
| SOX2 | Anterior | 2.34335 | -2.74856 | 2.44645 | | | | 1.6511 | |
| BMP4 | Ventral in AFE | 3.3294 | | 2.39307 | | 4.1267 | | -1.43512 | |
| APOB | Liver | 5.98945 | 1.84783 | 1.77617 | | 8.83739 | | | -5.49133 |
| PTCH1 | Dorsal (DrsFE) | -3.99507 | | 1.14939 | -19.055 | 21.1998 | 22.2908 | -1.20767 | |
| SFRP5 | Anterior | -4.44615 | -0.34742 | 0.468872 | | 6.23563 | | 2.7591 | |
| CDX2 | Posterior/Intestines | | | 0.45543 | | -0.54328 | -8.48022 | | -14.3434 |
| OSR1 | Stomach Domain | | -0.643 | 0.224352 | | 5.44806 | | -0.15143 | -10.7543 |
| HNF1B | Posterior Foregut | -3.71677 | 1.53601 | -0.19081 | | 1.1861 | | 0.293652 | -17.1402 |
| LZTS1 | Ventral | 8.04763 | | -1.58182 | | 6.23523 | -12.9443 | -6.02503 | |
| HNF6 | MPC/Duct | 2.03616 | | -3.10951 | | -1.53092 | | 2.24782 | -1.71548 |
| MNX1 | Dorsal | 2.3393 | | | | -2.75654 | | | |
| HHEX | Ventral | 5.99379 | -1.92768 | | -26.4833 | 10.7469 | | -10.9249 | 6.13477 |
| Noggin | Dorsal in AFE | -4.23674 | -2.13977 | | | 9.37824 | | | -0.18411 |

FIG. 25

GENERATING DORSAL FOREGUT, AND ANTERIOR DOMAIN, ENDODERM CELLS

The present application claims priority to U.S. Provisional application Ser. No. 62/851,348, filed May 22, 2019, which is herein incorporated by reference in its entirety.

FIELD

Provided herein are compositions, systems, kits, and methods for generating dorsal foregut endoderm (DFE) cells by contacting pluripotent stem cells with a retinoic acid signaling pathway agonist and a bone morphogenetic (BMP) pathway inhibitor without exposing the stem cells to a transforming growth factor beta (TGFβ) pathway agonist. In certain embodiments, the DFE cells are contacted with a retinoic acid signaling pathway agonist and a FGFR pathway inhibitor to generate pancreatic endoderm (PE) cells (e.g., with dorsal identity). In other embodiments, the PE cells are contacted with an ALK5 inhibitor and a Notch inhibitor to generate endocrine cells (e.g., insulin expressing cells). In certain embodiments, compositions, systems, kits, and methods are provided for generating anterior domain endoderm (ADE) cells.

BACKGROUND

Endoderm is the germ layer that creates the majority of cells within most of the internal organ systems, such as lung, stomach, pancreas, liver and gut. Almost all efforts on inducing endoderm from pluripotent cells have relied on using a TGFβ pathway agonist, most commonly Activin A (AA), as a Nodal mimic to push pluripotent cells through an in vitro gastrulation event (D'Amour et al., 2005, Gadue et al., 2006). This results in an endodermal population that can be used for generating multiple descendent fates including intestinal (Spence et al., 2011), pancreatic (Kroon et al., 2008, Rezania et al., 2014, Pagliuca et al., 2014) and liver (Sampaziotis et al., 2015). Generation of more anterior endodermal fates, such as lung, has been achieved by providing patterning inputs at a subsequent stage (Green et al., 2011). However, recent studies argue that initial patterning of definitive endoderm may occur during its generation (Matsuno et al., 2016, Loh et al., 2014).

The pancreas is of particular interest for cell based therapy in diabetes which is characterized by defects in insulin-producing cells. The pancreas is formed from two spatially distinct primordia arising on the dorsal and ventral sides of the primitive gut tube, which subsequently fuse. While both pancreatic buds are capable of generating all lineages of the adult pancreas (Matsuura et al., 2009), the initial induction of the pancreatic domains on opposing sides of the gut tube are controlled by distinct transcriptional programs. In mice, the ventral pancreatic bud forms first at approximately embryonic day 8.5 (E8.5) from a region of endoderm possessing bi-potential competence for pancreas and liver (Angelo et al., 2012, Deutsch et al., 2001, Tremblay and Zaret, 2005). This early ventral endoderm field is composed of a progenitor population that co-expresses Pdx1/Sox17 transiently, which by E9.5 splits to form the ventral pancreas and the extra-hepatobiliary system, respectively (Spence et al., 2009). Specification of the ventral pancreas relies on HHex expression where gene ablation models have demonstrated complete ventral agenesis without affecting dorsal pancreatic bud formation (Bort et al., 2004). In contrast, the dorsal pancreatic bud in mice emerges at approximately embryonic day 9.0 and forms from an outgrowth caudal to the antral stomach region. Studies in mice have also identified factors involved in dorsal pancreatic specification with no effect on ventral organogenesis. Mnx1 (Hlxb9) knock out models have shown dorsal agenesis occurs without a ventral phenotype (Li et al., 1999). Mnx1 expression is observed in the ventral field but only following Pdx1 expression, whereas in the dorsal field, Mnx1 precedes Pdx1 expression. Raldh2 knock out models resulted in a dorsal-specific agenesis attributed to the loss of Pdx1 and Prox1 expression in the dorsal bud (Martin et al., 2005, Molotkov et al., 2005). Furthermore, studies in chicks have shown that the initial budding of the dorsal pancreas is dependent on the selective inhibition of SHH within the dorsal midgut (Hebrok et al., 1998). While it is unclear if the murine system is conserved between species, a recent study using laser capture followed by deep sequencing analysis described some fundamental differences between the ventral and dorsal pancreas during human development (Jennings et al., 2017).

Despite differential pathway utilization and distinct cell intrinsic factors the dorsal and ventral pancreatic programs have much in common. HNF1β (Tcf2) is required for pancreas specification in both pancreatic buds and is critical through pancreatic development. Tcf2 knockout mice fail to generate a ventral pancreas and have a greatly reduced dorsal bud incapable of differentiating or proliferating (Haumaitre et al., 2005). HNF1β is expressed in the pre-pancreatic foregut and the gene functions at the apex of a sequential transcriptional cascade resulting in the activation of Hnf6 (Oc1) followed by Pdx1 (Poll et al., 2006). Conditional inactivation of HNF1β results in a loss of Glis3 and Ngn3 expression and results in a pancreas characterized with cystic ducts and a loss of the pro-endocrine field (De Vas et al., 2015). In human development the importance of HNF1β is highlighted by the occurrence of 'maturity onset diabetes of the young type 5' (MODY5) syndrome, a condition attributed to mutations in the HNF1β gene. While a heterozygous mutation in HNF1β does not display a phenotype in mouse studies, in humans heterozygous mutation of HNF1β have been shown to be associated with MODY5 or complete pancreatic agenesis suggesting a more important role for HNF1β in human pancreatic development than mouse (Body-Bechou et al., 2014).

SUMMARY

Provided herein are compositions, systems, kits, and methods for generating dorsal foregut endoderm (DFE) cells by contacting pluripotent stem cells with a retinoic acid signaling pathway agonist and a bone morphogenetic (BMP) pathway inhibitor without exposing the stem cells to a transforming growth factor beta (TGFβ) pathway agonist. In certain embodiments, the DFE cells are contacted with a retinoic acid signaling pathway agonist and a FGFR pathway inhibitor to generate pancreatic endoderm (PE) cells (e.g., with dorsal identity). In other embodiments, the PE cells are contacted with an ALK5 inhibitor and a Notch inhibitor to generate endocrine cells (e.g., insulin expressing endocrine cells). In certain embodiments, compositions, systems, kits, and methods are provided for generating anterior domain endoderm (ADE) cells.

In some embodiments, provided herein are methods of generating dorsal foregut endoderm cells comprising: a) contacting a population of pluripotent stem cells (e.g., iPSCs or embryonic stem cells) with a retinoic acid signaling pathway agonist and a bone morphogenetic (BMP) pathway inhibitor; and b) culturing at least a portion of the population of pluripotent stem cells such that a population of dorsal foregut endoderm (DFE) cells is generated; wherein the stem cells are not exposed to a transforming growth factor beta (TGFβ) pathway agonist during the culturing or during the contacting.

In certain embodiments, provided herein are compositions comprising: a cell, wherein the cell comprises: i) an exogenous retinoic acid signaling pathway agonist, and ii) an exogenous bone morphogenic (BMP) pathway inhibitor, and wherein the cell: i) is free from any exogenous transforming growth factor beta (TGFβ) pathway agonist, and ii) is a pluripotent stem cell (e.g., iPSCs or embryonic stem cells) or a dorsal foregut endoderm cell.

In particular embodiments, provided herein are compositions comprising: cell culture media, wherein the cell culture media comprises: i) a retinoic acid signaling pathway agonist compound, and ii) a bone morphogenic (BMP) pathway inhibitor; and wherein the culture media is free, or detectably free, of any transforming growth factor beta (TGFβ) pathway agonist. In particular embodiments, the cell culture medium comprises an appropriate source of energy and compounds which regulate the cell cycle. In certain embodiments, the cell culture medium comprises most or all of the following: amino acids, vitamins, inorganic salts, glucose, and serum as a source of growth factors, hormones, and attachment factors. In some embodiments, the compositions further comprise: a population of cells, wherein the cells are pluripotent stem cells (e.g., iPSCs or embryonic stem cells) or dorsal foregut endoderm (DFE) cells. In other embodiments, the cells are pluripotent stem cells, and wherein the retinoic acid signaling pathway agonist and BMP pathway inhibitor are present in the culture media at concentrations that would cause at least a portion of the pluripotent stem cells to become DFEs when cultured in the media for at least 2 days.

In other embodiments, provided herein are kits and systems comprising, consisting essentially of, or consisting of: a) a population of pluripotent stem cells (e.g., iPSCs or embryonic stem cells) present in a cell culture container; b) a retinoic acid signaling pathway agonist compound present in a first container; and c) a bone morphogenetic (BMP) pathway inhibitor present in a second container; and wherein the cell culture container is free of any, or any detectable, exogenous transforming growth factor beta (TGFβ) pathway agonist, and wherein the kit and system does not contain any transforming growth factor beta (TGFβ) pathway agonist in the first or second containers, or in a third container. In further embodiments, the kits and systems further comprise culture media inside the culture container.

In other embodiments, the BMP pathway inhibitor is a BMP4 pathway inhibitor. In certain embodiments, the BMP pathway inhibitor comprises LDN193189. In further embodiments, the BMP pathway inhibitor is selected from the group consisting of: DMH1, DMH2, Dorsopmorphin, K02288, LDN214117, LDN212854, folistatin, ML347, Noggin. In some embodiments, the retinoic acid signaling pathway agonist is selected from the group consisting of: i) a retinoid compound, ii) a retinoid X receptor (RXR) agonist, and iii) a retinoic acid receptor (RARs) agonist. In particular embodiments, the retinoic acid signaling pathway agonist is selected from the group consisting of: retinoic acid, Sr11237, adapalene, EC23, 9-cis retinoic acid, 13-cis retinoic acid, 4-oxo retinoic acid, and All-trans Retinoic Acid (ATRA). In particular embodiments, the culturing is conducted for 1-5 days (e.g., 1, 2, 3, 4, or 5 days) or 2-4 days.

In some embodiments, the methods further comprise: c) contacting at least a portion of the population of DFE cells with a retinoic acid signaling pathway agonist and a FGFR pathway inhibitor; and d) culturing a least a portion of the population of DFE cells such that a population of pancreatic endoderm (PE) cells is generated. In certain embodiments, the DFE cells are not exposed to a transforming growth factor beta (TGFβ) pathway agonist during the culturing in step d) or during the contacting in step c). In some embodiments, the culturing in step d) is conducted for about 1-5 days (e.g., 1, 2, 3, 4, or 5 days) or 2-4 days. In certain embodiments, the PE cells have a dorsal pancreatic identity. In some embodiments, the FGFR pathway inhibitor is selected from the group consisting of: PD0325901, Arctigenin, PD184352, PD198306, PD334581, SL 327, U0126, a MEK inhibitor, a FGFR inhibitor, and a MAPK inhibitor. In certain embodiments, the contacting in step c) further comprises contacting the population of DFE cells with a sonic hedgehog (SHUT) pathway inhibitor.

In certain embodiments, the methods further comprise: e) contacting at least a portion of the population of PE cells with a Notch pathway inhibitor and an ALK5 inhibitor; and f) culturing a least a portion of the population of PE cells such that a population of endocrine cells are generated. In some embodiments, the endocrine cells are insulin-expressing cells. In other embodiments, the endocrine cells are fetal-type (3 cells. In particular embodiments, the Notch pathway inhibitor comprises gamma secretase inhibitor XX, also known as DBZ. In other embodiments, the Notch pathway inhibitor is selected from the group consisting of DAPT, MRK-003, MRK-0752, z-Ile-leu-CHO, gamma secretase inhibitor, L-685,485, LY411575, Compound E, F-03084014, R04929097, and BMS-906024. In some embodiments, the ALK5 inhibitor comprises A8301. In additional embodiments, the ALK5 inhibitor is selected from the group consisting of: A7701, A83-01, SB505124, SB431542, Alantolactone, and LY2157299. In further embodiments, the culturing in step f) is conducted for 5-15 days (e.g., 5, 6, 7, 8, 9, 10, 11, 12, 13, 14 or 15 days).

In some embodiments, the cells generated by the methods herein (e.g., the endocrine cells) are transplanted into a subject to provide a therapeutic benefit. In some embodiments, the transplanted cells are insulin-expressing cells as the subject has diabetes.

In certain embodiments, the methods herein further comprise: c) contacting at least a portion of the population of DFE cells with EGF; and d) culturing a least a portion of the population of DFE cells such that a population of stomach endoderm (SE) cells is generated.

In other embodiments, the methods herein further comprise: c) contacting at least a portion of the population of DFE cells with BMP4 or a BMP pathway agonist (e.g., sb4); and d) culturing a least a portion of the population of DFE cells such that a population of liver endoderm (LE) cells is generated.

In other embodiments, the methods herein are employed to create anterior definitive endoderm (ADE). Anterior definitive endoderm is lying more anterior to the DFE and DE, and encompass corresponding cells to the pharyngeal endoderm. Said ADE express specific marker genes such as TBX1, PAX9 and OSR1, and represent progenitors for cell lineages of the pharyngeal region, including, but not limited to, Lung, Thymus, and Thyroid.

In some embodiments, provided herein are methods of generating anterior domain endoderm cells comprising: a) contacting a population of pluripotent stem cells with: i) Nodal protein and a BMP protein or BMP pathway agonist;

or vector(s) encoding said Nodal protein and said BMP protein or BMP pathway agonist (if it is a protein), and ii) an ALK5 inhibitor; and b) culturing at least a portion of the population of pluripotent stem cells such that a population of anterior domain endoderm (ADE) cells is generated. In certain embodiments, the pluripotent stem cells are not exposed to: i) a BMP inhibitor, and/or ii) a transforming growth factor beta (TGFβ) pathway agonist, during said culturing or during said contacting.

In certain embodiments, provided here are compositions comprising: a) Nodal protein or a vector encoding the Nodal protein; b) a BMP protein or BMP pathway agonist or a vector encoding the BMP protein or BMP agonist if a protein, and c) an ALK5 inhibitor. In some embodiments, the composition is free from: a BMP inhibitor, and/or ii) a transforming growth factor beta (TGFβ) pathway agonist. In certain embodiments, a single vector encodes both the Nodal protein and the BMP protein (or BMP pathway agonist if a protein), and in other embodiments, separate vectors are employed. In other embodiments, the compositions further comprise: a population of cells, wherein the cells are pluripotent stem cells or anterior domain endoderm (ADE) cells.

In some embodiments, provided herein are kits or systems, consisting essentially of, or consisting of: a) a population of cells present in a cell culture container; b) Nodal protein or a vector encoding the Nodal protein present in a first container; c) a BMP protein or BMP pathway agonist or a vector encoding the BMP protein or BMP agonist if a protein present in a second container; and d) an ALK5 inhibitor present in a third container.

In certain embodiments, the cell culture container is free of any, or any detectable exogenous BMP inhibitor, and/or exogenous transforming growth factor beta (TGFβ), and wherein the kit and system does not contain any detectable exogenous BMP inhibitor, and/or exogenous transforming growth factor beta (TGFβ) in the first, second, third containers, or in a fourth container. In other embodiments, the cells are pluripotent stem cells or anterior domain endoderm (ADE) cells. In further embodiments, the ALK5 inhibitor is selected from the group consisting of: A7701, A-83-01, SB505124, SB431542, Alantolactone, and LY2157299. In further embodiments, the BMP protein is BMP4 protein.

DESCRIPTION OF THE FIGURES

FIG. 17 shows the contribution of activin A, BMP4 and Retinoic acid towards patterning endoderm during gastrulation. The relative factor contributions obtained from a DoE-based modeling experiment assaying the effects of activin A, BMP4 and retinoic acid during an in vitro gastrulation event are shown in the table.

FIG. 25. Anterior and midgut patterning occurs in the absence of AA signaling. Representative optimizers for master regulators for anterior and midgut genes.

DETAILED DESCRIPTION

Figure 1:
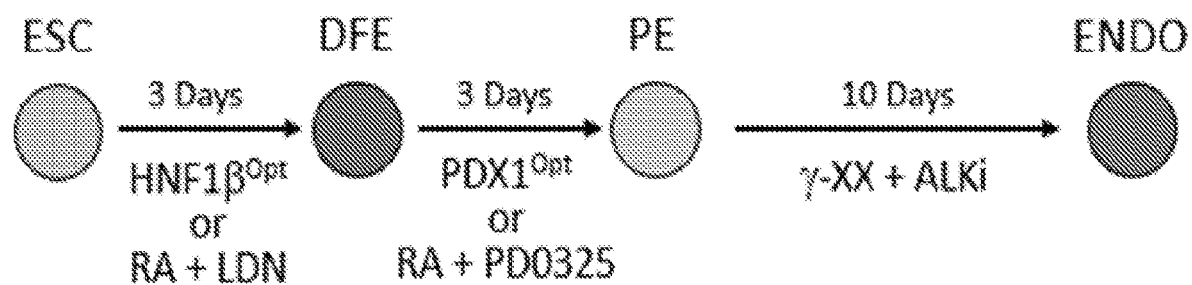
FIG. 1 shows an exemplary method for generating dorsal foregut endoderm (DFE) cells.

Provided herein are compositions, systems, kits, and methods for generating dorsal foregut endoderm (DFE) cells by contacting pluripotent stem cells with a retinoic acid signaling pathway agonist and a bone morphogenetic (BMP) pathway inhibitor without exposing the stem cells to a transforming growth factor beta (TGFβ) pathway agonist. In certain embodiments, the DFE cells are contacted with a retinoic acid signaling pathway agonist and a FGFR pathway inhibitor to generate pancreatic endoderm (PE) cells (e.g., with dorsal identity). In other embodiments, the PE cells are contacted with an ALK5 inhibitor and a Notch inhibitor to generate endocrine cells (e.g., insulin expressing endocrine cells). In certain embodiments, systems, kits, and methods are provided for generating anterior domain endoderm (ADE) cells.

The derivation of endoderm and descendent organs, such as pancreas, liver, and intestine is impacting disease modeling and regenerative medicine. Common methods for induction of definitive endoderm from pluripotency invariably involves the use of TGFβ signaling agonism, most commonly Activin A. Work conducted during development of embodiments described herein determined that Activin A was not required, but that BMP antagonism and retinoid input could be successfully employed to lead to induction of dorsal foregut endoderm (DFE), and that Activin-induced endoderm results in cells displaying a ventral heterogeneous character. Such demonstrated that pancreatic identity can be rapidly, and robustly, induced from DFE and that such cells are of dorsal pancreatic identity. In such work, the DFE population was highly competent to differentiate into both stomach organoids and pancreatic tissue types and effectively able to generate fetal-type β-cells through two subsequent differentiation through a small molecule based process. Generation of such pancreatic insulin producing cells is useful for, for example, cell based therapies for diabetes patients.

Work conducted during the development of embodiments herein demonstrated that effective, and regionalized patterned endoderm can be robustly differentiated directly from pluripotency without the use of TGFβ agonism, and from such cells create pancreas and other endodermal derivatives. Embodiments herein provide a robust protocol for inducing specialized human endoderm representative of the dorsal foregut region of the gut tube. Such generated cells can be effectively converted into dorsal pancreatic progenitors which subsequently are able to adopt endocrine fates, including the generation of fetal-like beta cells.

The present disclosure is not limited by the type of media or culture system that is employed. Any suitable media and culture system may be employed. For example, those skilled in the art understand that multiple methods for the culture and expansion of pluripotent stem cells, with and without mesenchymal feeder cells, and with and without fully chemically defined conditions, such as culture in the presence of serum, or other complex not fully defined additives, are available. Also, multiple, and flexible, growth media bases are available, exemplified by hybrid media (e.g., media mixtures, such as CDM2 as used within), as well as specific media such as Essential-8, Essential-6, TesR media, and various supplements such as KOSR, used to support expansion of the pluripotent stem cell state, regardless of cell origin such as ESC or iPSC. In certain embodiments, one may employ a series of continued, serial in nature, specific media, all of which have an underlying base media, which may flexibly be explored from a range of broadly used cell culture media such as RPMI1640, DMEM, F2, and others. As commonly performed by those skilled in the art, such media are then provided a series of metabolically supporting molecules, such as pyruvate, an anaplerotic agent such as glutamine, chemically defined lipids, a fuel source, such as glucose, and in some cases a chemically defined growth support such as B27. In certain embodiments, various base media are employed, as well as the metabolically supporting molecules.

In certain embodiments, the cells produced with the methods and compositions herein are endocrine pancreatic insulin producing cells. In particular embodiments, such cells are macroencapsualted as is known in the art and then transplanted into a patient with diabetes (see, e.g., Hwa et al., Curr Diab Rep. 2018 Jun. 16; 18(8):50, incorporated by reference herein). In other embodiments, the insulin producing cells are transplanted into a subject's liver (e.g., a subject with diabetes). In other embodiments, such cells are transplanted subcutaneously in a protective device, such as described in clinical trial NCT03163511. In yet other embodiments, such cells are transplanted in microencapsulated spheres, such as described in clinical trial NCT01739829. In other embodiments, such cells are implanted in an oxygen-providing device, such as described in clinical trial NCT02064309. In other embodiments, such cells may be transplanted in a suitable site (e.g., subcutaneously, intraperitoneally, intravenously) without physical protection, but in the presence of an immunomodulatory agent. In other embodiments, such cells may be transplanted using a retrievable polymer nanoporous string, coated with alginate, and implanted intraperitoneally, as described by An et al., Proc Natl Acad Sci USA. 2018 Jan. 9; 115 (2):E263-E272, herein incorporated by reference. In some embodiments, the diabetic patient may be a type II diabetic patient, with no signs of autoimmunity. In some embodiments, the cells may be derived through the process of pluripotent stem cell reprogramming and be of a similar genetic makeup as the recipient.

In certain embodiments, certain cells are substituted in for the pluripotent stem cells as the original set of cells that are treated. Such cells include, but are not limited to, EP (endodermal progenitor cells, such as described by Cheng et al., Cell Stem Cell. 2012 Apr. 6; 10(4):371-84, herein incorporated by reference; EPIBLAST stem cells, such as described by Tesar Proc Natl Acad Sci USA. 2005 Jun. 7; 102(23):8239-44 (herein incorporated by reference), or embryonic germ cells, such as described by Kimura et al., Stem Cells. 2014 October; 32(10):2668-78, herein incorporated by reference. The present disclosure is not limited by the species from which the pluripotent stem cells, or other cells described above, are derived. All vertebrate species create a similarly patterned endoderm, including forming an anterior-positioned derivative to that described within, generating anterior endodermal descending tissues, and all the vertebrate species generate cells of such endoderm that produce an insulin molecule that controls glucose homeostasis. In some embodiments, the generation of pancreatic endoderm, pancreatic insulin producing cells from a non-human species may be used advantageously to provide a means to derive a cell based therapy, when such as combined with either a microencapsulation device; a macroencapsulation device, or an immunosuppressive drug regimen, or alternatively, genetically modified to enable loss of immune detection. Furthermore, such cells, regardless of species origin, can be used as a basis for drug discovery of in-vitro derived insulin producing cells, and as such lead to the identification of novel drugs impacting the diabetic state.

In certain embodiments, the insulin producing cells produced by the methods and compositions described herein are employed with the technologies of any of the following companies: 1) Seraxis (Cell Replacement Therapy for Type 1 Diabetes); 2) Unicyte AG (Diabetes Cell Therapy); 3) ViaCyte (Insulin for Diabetes); 4) Sernova (Stem Cell for Diabetes Treatment); 5) Betalin Therapeutics (Insulin Production); 6) AltuCell (Stem Cell Therapy for Diabetes Type 2); 7) NextCell Pharma AB (Stem Cell Therapy for Diabetes Type 1); 8) Osiris Therapeutics (Type 1 Diabetes Control); 9) Mesoblast (Type 2 Diabetes Treatment); 10) Evotec and Sanofi (Stem Cell for Diabetes); 11) Orgenesis (Insulin-Producing Cells); 12) Semma Therapeutics (Type 1 Diabetes Therapy); 13) Novo Nordisk (Treatment of Type 1 Diabetes); 14) Beta-02 (Artificial Pancreas for Diabetes); 15) Eli Lilly and Sigilon (Stem Cell for Diabetes).

EXAMPLES

Example 1

Robust and Rapid Induction Conditions for Dorsal Pancreatic Endoderm from Pluripotency This Example describes generating dorsal foregut endoderm (DFE) cells from pluripotent stem cells. This example also described generating dorsal pancreatic endoderm cells from the DFE cells.

Results

Two Separate and Distinct Pathways Exist for Endoderm Induction

We initially set out to predict conditions needed to define a primitive-streak descendant definitive endoderm population as suggested by literature. This was accomplished by defining an anterior primitive streak (APS) population by modeling for the maximal expression of MESP1, EOMES and BRACHYURY/T while minimizing EVX1 (posterior primitive streak marker) (Loh et al., 2014). Through ISPA, the conditions predicted to generate this differentiation event consisted of low tolerance to Wnt inhibition (FC=18.65) and high levels of Activin A (FC=18.85) (FIGS. 2A & 2B). These conditions agree with current protocols for generating definitive endoderm (DE) (D'Amour et al., 2005), which rely on node signaling. Indeed, when using this condition to differentiate pluripotent cultures the majority of the culture converted into a FOXA2+/SOX17+ population within 3 days (FIG. 2C). Through ISPA, a number of other genes were predicted to be highly expressed under these conditions (carry-on genes) including COL6A1, HHEX, MESP2, SOX17 (FIG. 2D and data not shown). Of note, POU5F1 (OCT4) remained high, agreeing with a node-like state. These genes are all known to be elevated in immediate descendants following gastrulation in mice. However, through ISPA, we noted that not all known early endoderm-expressed genes were uniquely maximized through the APS conditions. Inspecting the known space from the aforementioned experiment, a quite different solution set could be obtained focusing on HNF1β (TCF2) expression, also known to be expressed in definitive endoderm. Maximizing for HNF1β expression led to expression of accompanying genes such as FOXA2, HNF4a, MNX1, CXCR4, MTF1, all known markers of endoderm, while expression of HHEX and SOX17 remained low (ISPA results not shown). We went on to characterize these distinct states, and the requirements for their induction.

Figure 8:
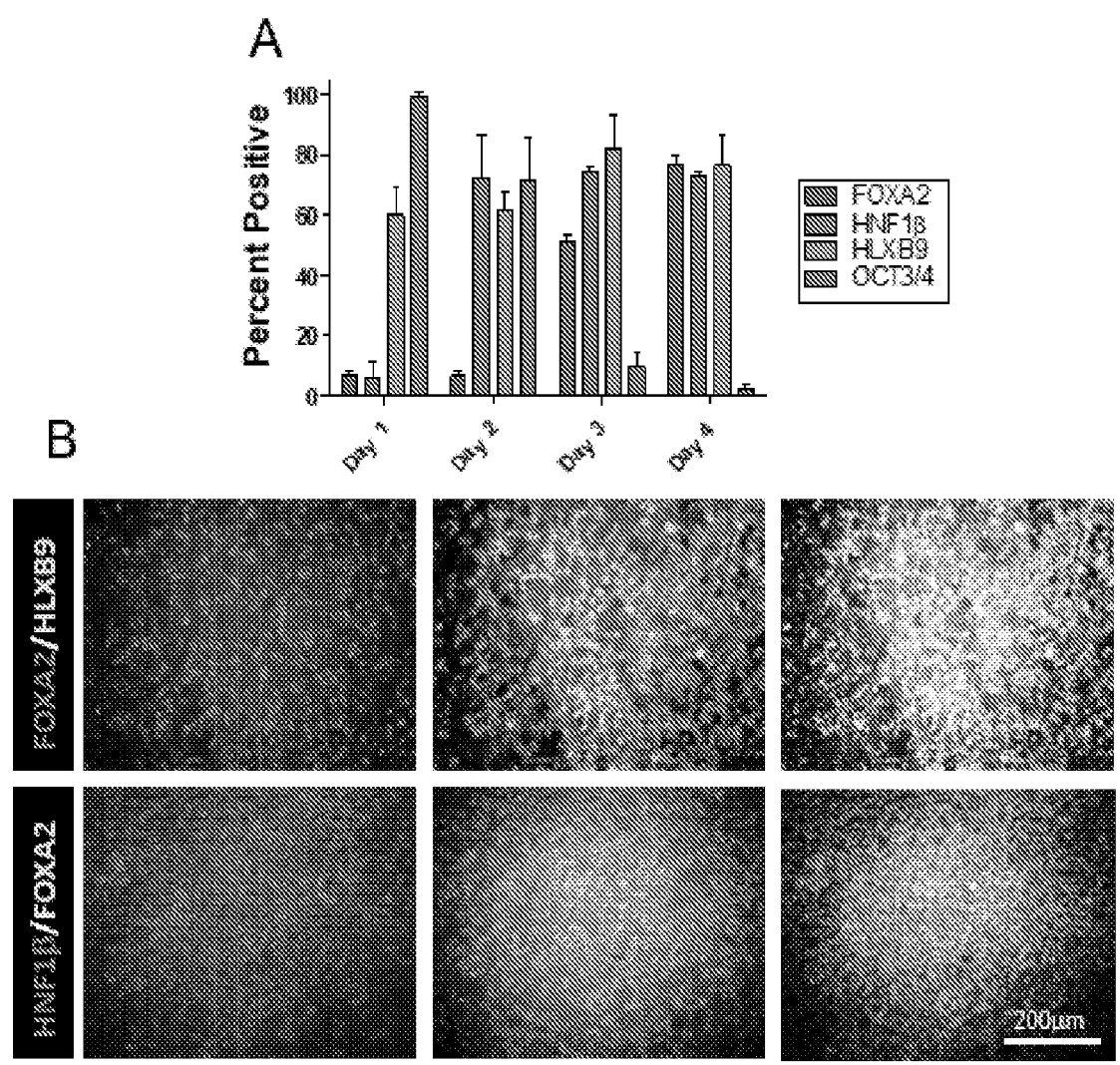
FIG. 8 shows the kinetics of DFE induction. A: graph showing the relative percentage of cells positive for FOXA2, HNF1β, HLXB9 and OCT3/4 over the course of a 4 day incubation period using HNF1β$^{opt}$. B: representative IHC for HNF113, FOXA2 and HLXB9 at day 3 of the differentiation protocol.
Figure 9:
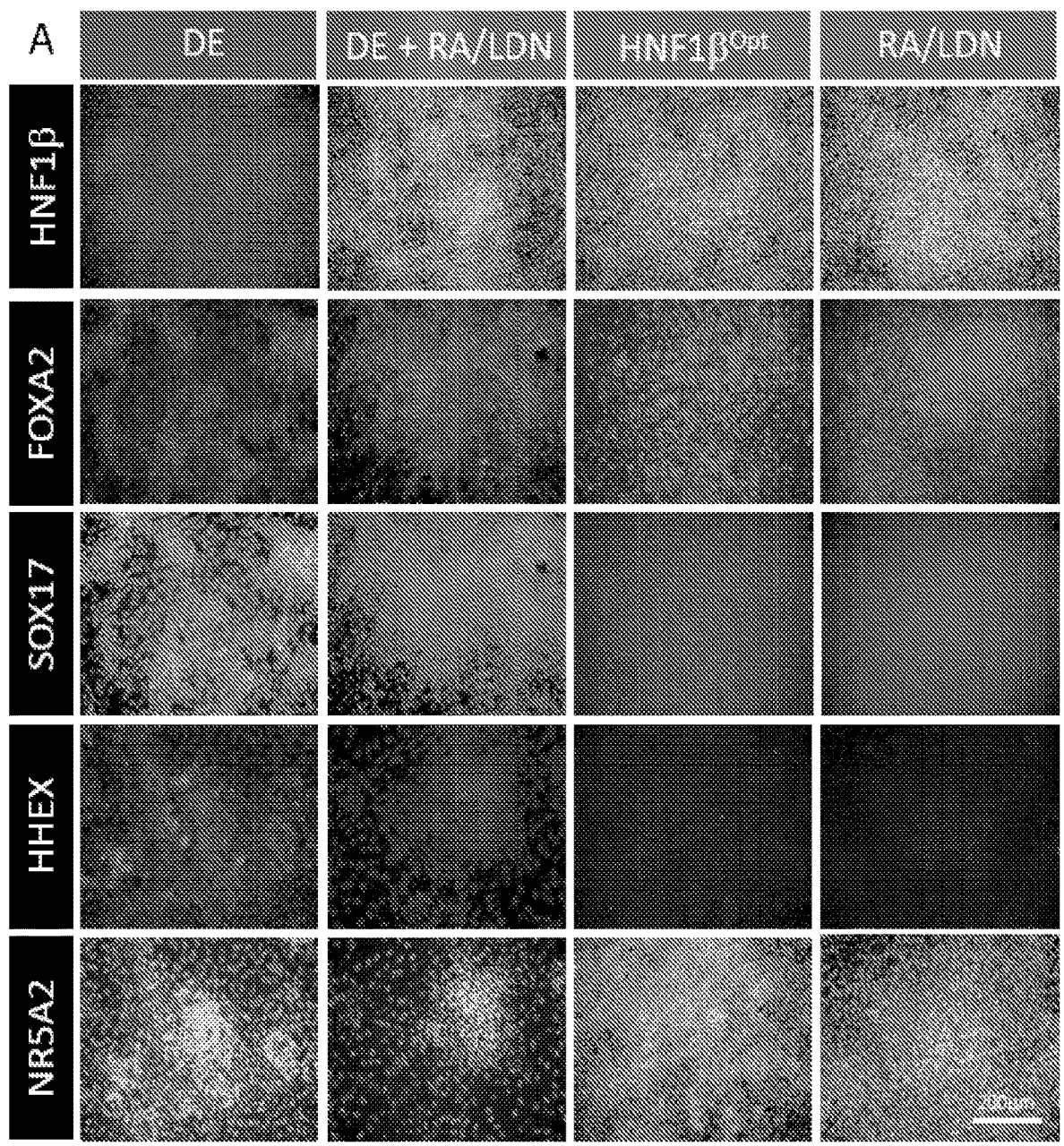
FIG. 9 shows that the protocol inputs of DFE do not change the patterning of DE. A: representative IHC showing differential expression between to TGFβ or retinoic acid responsive genes.

Retinoic Acid and Bmp Inhibition Synergistically Induce an Endodermal Program Mutually Exclusive to Activin-Induced Endoderm Using ISPA, we extracted the fundamental logics governing endodermal gene induction. For the APS-derived DE, it was clear that many early endoderm genes were under the direct control of TGFβ signaling, displaying strong and positive coefficient terms from AA in their complex regulatory models. These genes included, but were not limited to, SOX17, CXCR4, LEFTY1, MIXL1 and HHEX (FIG. 2D). This was not the case for multiple other known endoderm markers. A sub-group of endoderm genes did not respond to Activin A stimulation, but were directly dependent on retinoic acid signaling and to a lesser extent required the inhibition of the BMP pathway. These genes included FOXA2, EPCAM, ONECUT1, CDX2 and MNX1 (FIG. 2D) and were predicted to be directly controlled through the synergistic effects of retinoic acid and BMP inhibition with high factor contributions including FOXA2 (FC for RA=24.8, BMPi=25.3), HNF1β (FC for RA=30.1, BMPi=31.7), MNX1 (FC for RA=22.7, BMPi=30.5) (FIG. 2B and data not shown). Of note, Activin A was predicted to have no contribution to activating these genes, rather, inhibition of the TGFβ pathway was predicted to benefit the expression of these genes with factor contributions for Alk5i being 7.59 for HNF1β, 8.88 for FOXA2 and 18.98 for MNX1 (FIG. 2B and data not shown). The predicted conditions for HNF1β optimization (HNF1β$^{Opt}$) were tested on differentiating pluripotent cells for validation based on protein expression where HNF1β, MNX1 and FOXA2 could all be activated and cells effectively converted. Application of HNF1β$^{Opt}$ conditions resulted in the majority of the cells being HNF1β+ (FIG. 8) whereas APS differentiated cells showed only weak HNF1β expression (FIG. 2C).

Figure 2:
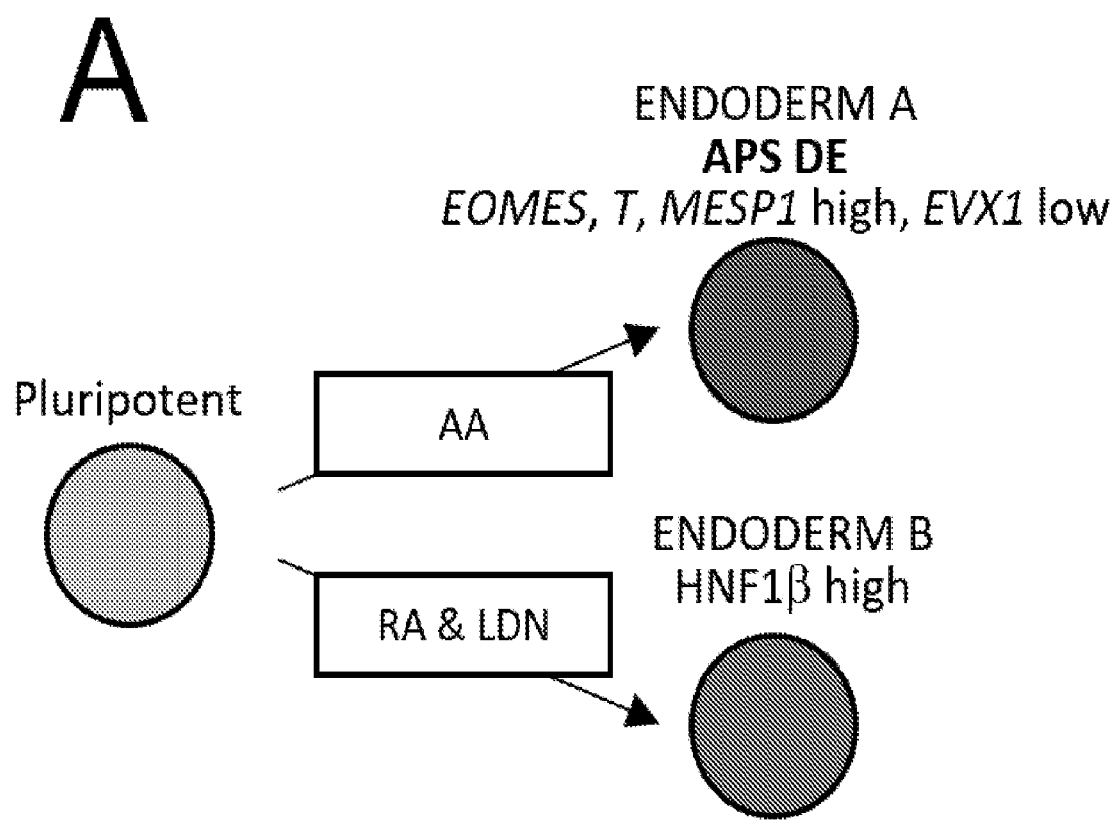
FIG. 2 shows results of effective endoderm induction in the absence of AA/WNT. A: Schematic of endodermal gene through Activin A induction of Anterior Primitive Streak (APS) versus endoderm induction optimizing for HNF1β induction. B: Predicted conditions for conditions satisfying APS gene induction (top circle) versus HNF1β induction (bottom circle). C: Validation of endodermal marker induction using the two separate protocols. D: Coefficient plots (primary effectors only) for select endodermal genes.
Figure 2:
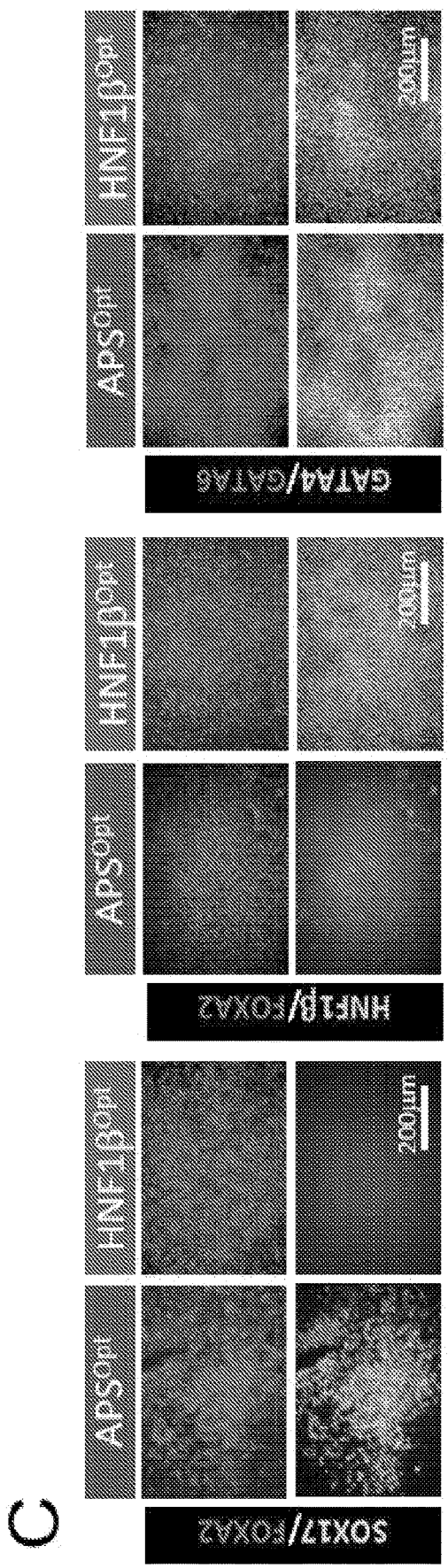
Figure 2:
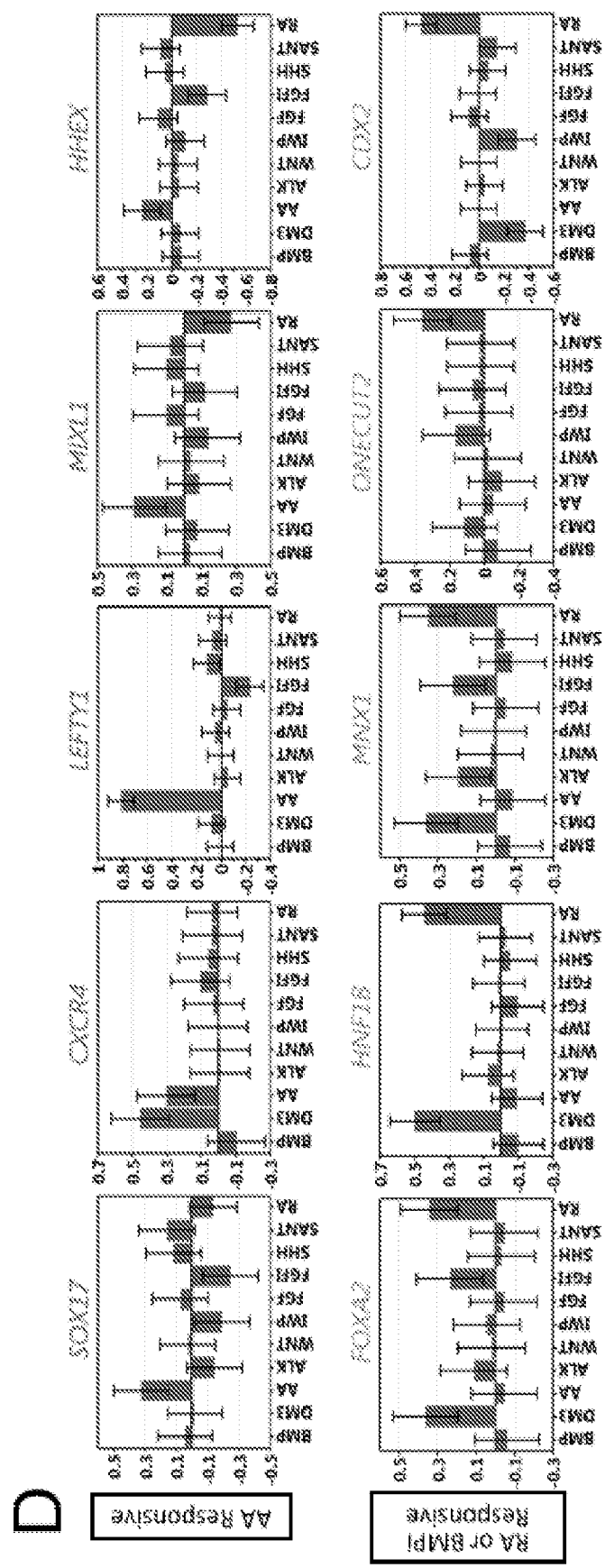
Figure 3:
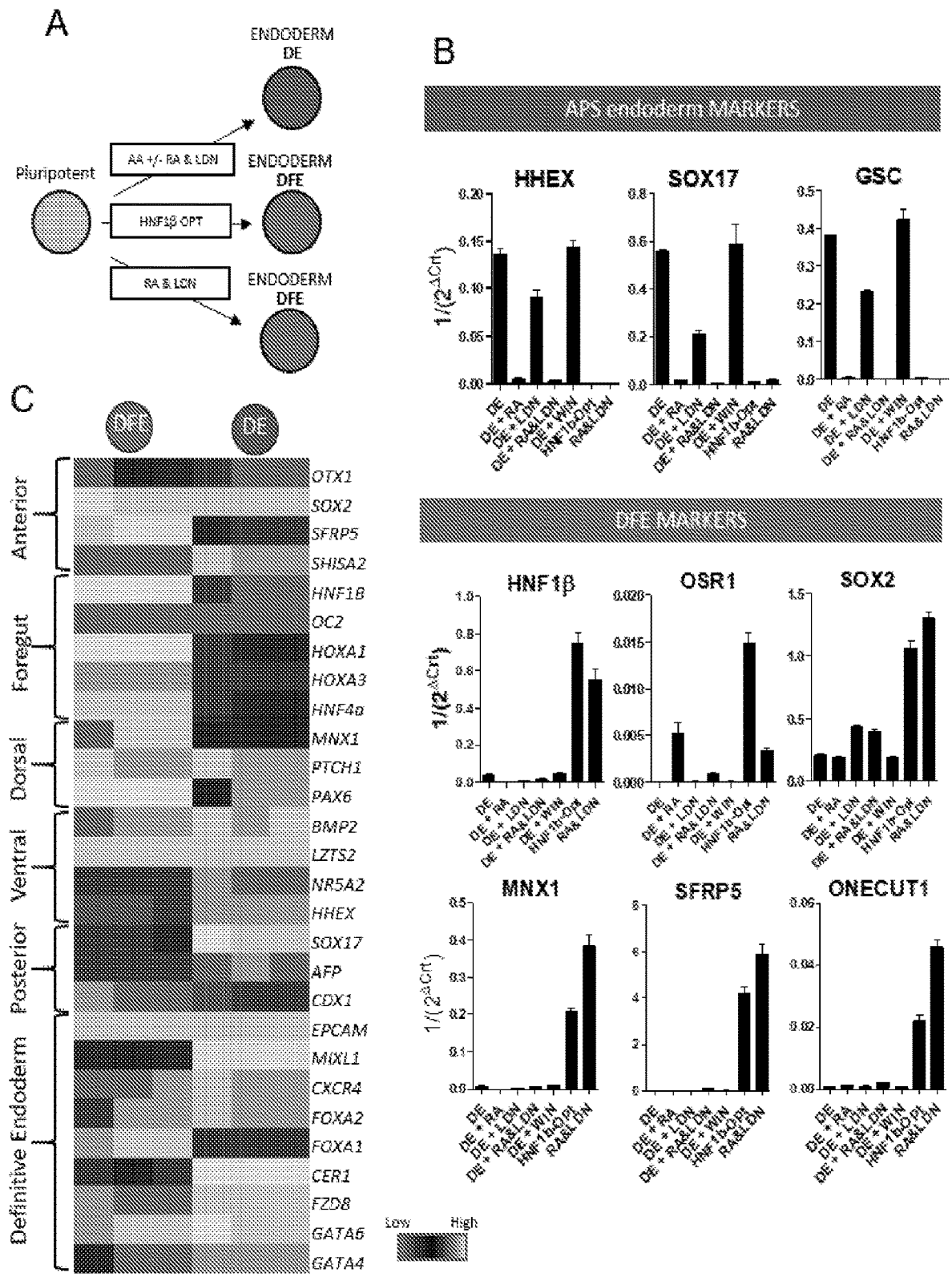
FIG. 3 shows non-APS derived endoderm is critically activated by retinoic acid and BMP Inhibition and demonstrates a dorsal foregut character. A: Schematic of the experiments performed. B: Graphs showing the relative expression of several endodermal genes in response to retinoic acid and BMP inhibition. Genes were normalized to the average expression of the endogenous levels of YWHAZ, GAPDH and TBP: DE—definitive endoderm, RA—retinoic acid, LDN—LDN3189 a BMP inhibitor and WIN—Win XXX an ALDH inhibitor. C: Heatmap containing key endodermal genes from pluripotent cultures either subjected to classic definitive endoderm differentiation conditions or differentiated using conditions predicted in the HNF1β optimizer.

The two paths to endoderm activation were fundamentally distinct and resting on conflicting input logic suggesting that the pathways were mutually exclusive. We tested this by creating hybrid protocols assaying the effects of RA and BMPi in the presence of Activin A (FIG. 3A). Inclusion of retinoic acid into the APS-based DE generating protocols (D'Amour et al., 2005) proved to only moderately increase gene expression for retinoic acid-responsive genes with only CDX2 (data not shown) and OSR1 (FIG. 3B) being significantly up-regulated in this manner. Conversely, known TGFβ-responsive genes were shown to be significantly down-regulated when retinoic acid was included in APS-type DE generating reactions including HHEX, SOX17 and GSC (FIG. 3B & Supp. FIG. 2). This demonstrates that presence of either of the key protocol drivers (AA versus RA) will suppress the other. Furthermore, also as predicted by ISPA, the genes up-regulated in the presence of retinoic acid and LDN3189 were activated more efficiently when Activin A was excluded from these reactions. Importantly, the two key protocol inputs for the HNF1β$^{OPT}$ conditions, RA and LDN3189 sufficed to initiate differentiation effectively (FIG. 3B).

Retinoic Acid/BMP Inhibition-Induced Endoderm is of a Dorsal Foregut Character

To gain a better understanding of the differing nature of the endodermal populations, we subjected cultures for RNA sequencing. Common endodermal genes expressed in both populations included CXCR4, FOXA2, EPCAM, GATA4 and GATA6 (FIG. 3C). However, significant differences were observed for genes associated with patterning revealing that HNF1β$^{Opt}$ induced endoderm was enriched in genes characteristic of known dorsal (MNX1 and PAX6) and foregut endoderm HOXA1, HOXA3, HNF4A and HNF1β (FIG. 3C). In contrast, APS-type DE showed an enrichment for genes representative of ventral endoderm NR5A2, HHEX and SOX17 and more posterior endoderm (SOX17 and AFP, though not CDX1) (FIG. 3C). Since the HNF1β$^{Opt}$ culture appeared to have more of a dorsal foregut endoderm (DFE) phenotype we challenged it for differentiation competence towards stomach, pancreas and liver (tissues derived from posterior foregut) using conditions previously shown to induce these fates from APS-derived DE (Supp. FIG. 3A); and comparatively to APS-derived DE. Striking differences in competence were observed when comparing the DFE to APS-DE populations. In all cases, APS-DE cultures activated liver genes more efficiently (APOB, HHEX and EVX1 (Supp. FIG. 3B)) than DFE. However, stomach (OSR1) and the pancreas (PDX1) were activated more effectively in the DFE cultures. When challenging the DFE culture to generate stomach organoids (FIGS. 10C & 10D, (McCracken et al., 2014)), OSR1 and PDX1 co-expression was observed as were SOX2 and PDX1 co-expression, suggesting that the stomach organoids preferentially converted into antral-type, posterior-most stomach (FIG. 10E).

Organ-Field Specification Mechanisms from Dorsal Foregut Endoderm

Figure 10:
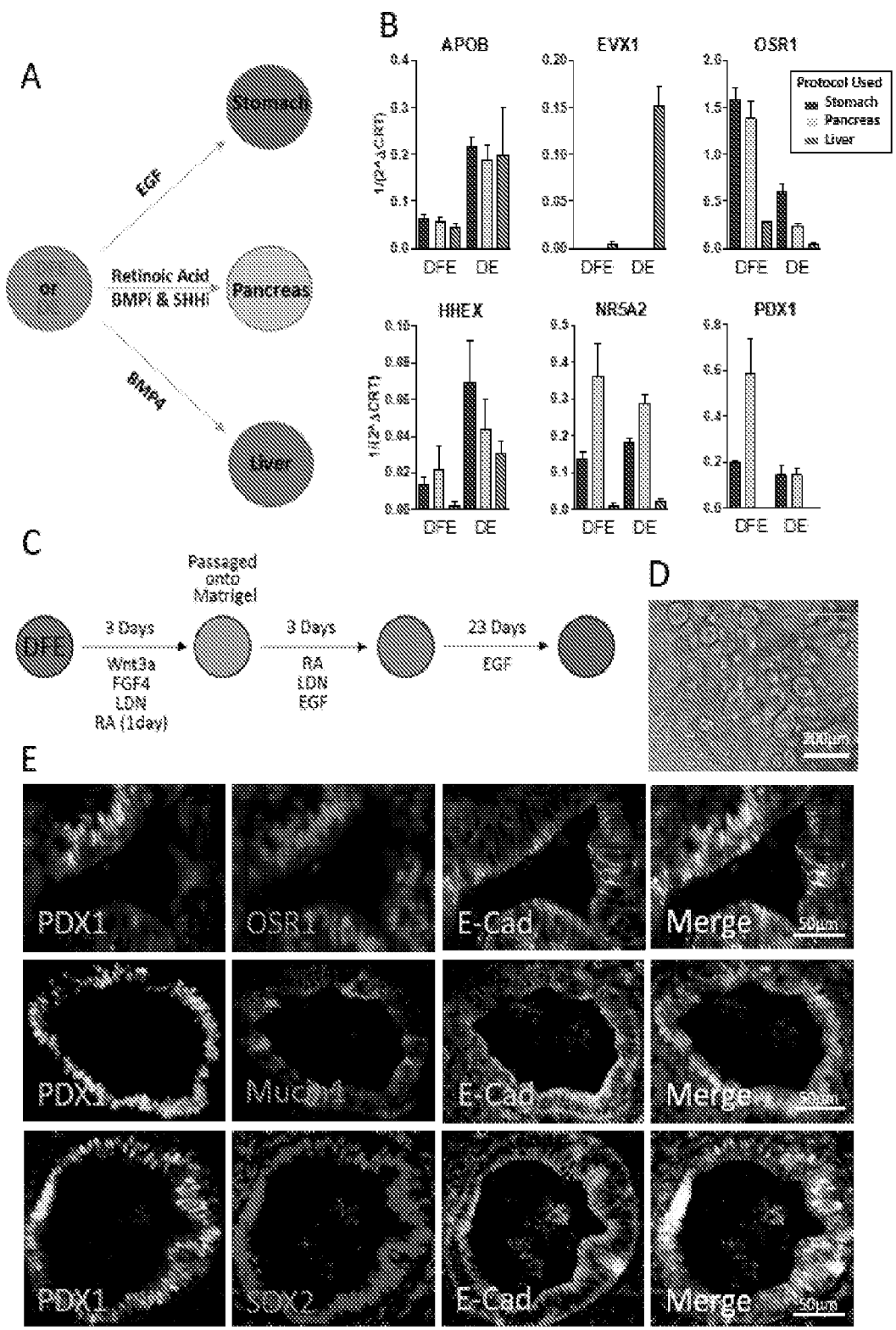
FIG. 10 shows that the patterning competence of DFE differs from DE-derived endoderm A: Shows a schematic of how either an HNF1β Optimized Culture or a culture differentiated to definitive endoderm respond to being challenged to differentiate towards stomach, pancreas or liver fates. B: Relative expression of select markers for genes indicated between the different protocols. Blue bars represent cultures that were provided conditions designed to differentiate towards stomach. Yellow bars are the cultures that were provided conditions that were designed to generate pancreas. Red bars represent the cultures that were provided conditions designed to generate liver. C: Schematic of a follow up experiment in which organoids were grown from HNF1$\beta^{opt}$ cultures challenged with stomach inducing conditions. D: DFE-Derived organoids that have been differentiated and grown for 23 days. E: Representative organoid staining for gene markers of PSC-derived presumptive antral PDX1+/SOX2+/OSR1+ stomach.
Figure 11:
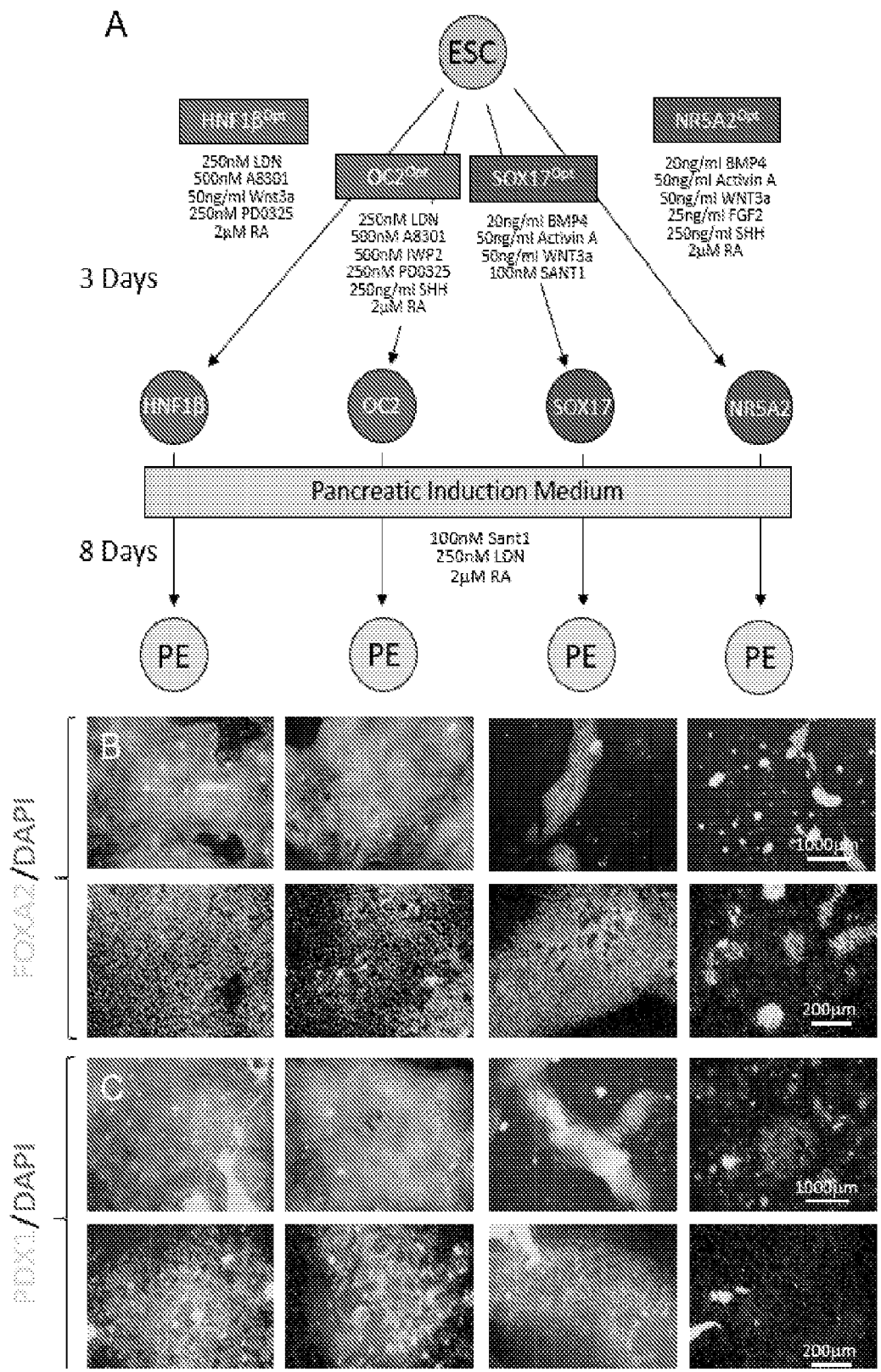
FIG. 11 shows that pancreatic competence is enhanced in DFE versus DE-derived endoderm A: Schematic indicating four different early endodermal genes that were optimized for through computer modeling and subsequently challenged for pancreatic competence. B: IHC validation of the four respective cultures for the general endodermal gene FOXA2. C: IHC validation of the four respective cultures for the pancreas specific gene PDX1.

When challenging cultures for pancreatic induction, DFE patterned cultures had a greater competence for PDX1 activation as compared to traditional DE induction methods (FIG. 10A). We therefore returned to ISPA to interrogate pancreatic induction by optimizing for different early endodermal markers at stage 1 to determine which would best allow for pancreatic conversion. We used ISPA to identify and compare independent conditions maximizing HNF1β or OC2 expression as representative genes under the control of retinoic acid or optimized for NR5A2 or SOX17 expression as representative genes under the control of TGFβ signaling (FIG. 11A). By first exposing pluripotent cultures to inducing conditions for each of the four genes (3 days), we then induced pancreatic formation using previously defined conditions (Mfopou et al., 2010). Cultures optimized for HNF1l3, or OC2, displayed a much more homogenous induction for the pancreatic marker PDX1, as well as FOXA2 (FIGS. 11B & C). Since we observed that the DFE cultures were competent for both stomach and pancreas induction we next evaluated this bi-potential nature through a sequential DoE modelling experiment performed on the DFE culture.

Figure 4:
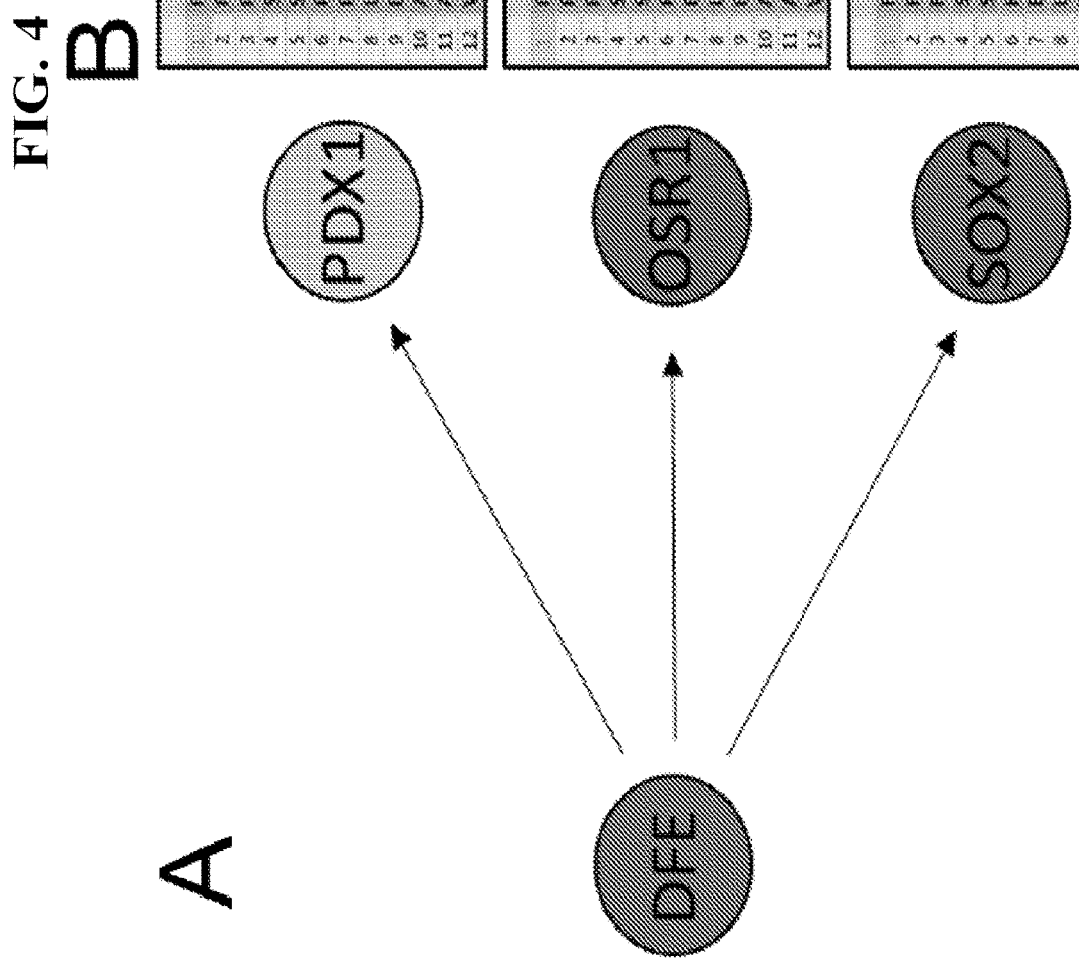
FIG. 4 shows that DFE can generate pancreatic endoderm with a highly dorsalized nature. A: Schematic showing modeling of the optimization for the stomach genes SOX2, OSR1 and the pancreatic gene PDX1. B: The corresponding optimizers for the predicted maximal induction of SOX2, OSR1 and PDX1 respectively. C: Dynamic profiles for the effectors most responsible for the respective gene activation. D: Representative IHC of PDX1$^{Opt}$. E: KeyGenes prediction for the respective DE and DFE derived pancreatic endoderm. F: Heatmap assessing the differential expression of several pancreatic and dorsal-specific pancreatic genes between the two protocols.
Figure 4:
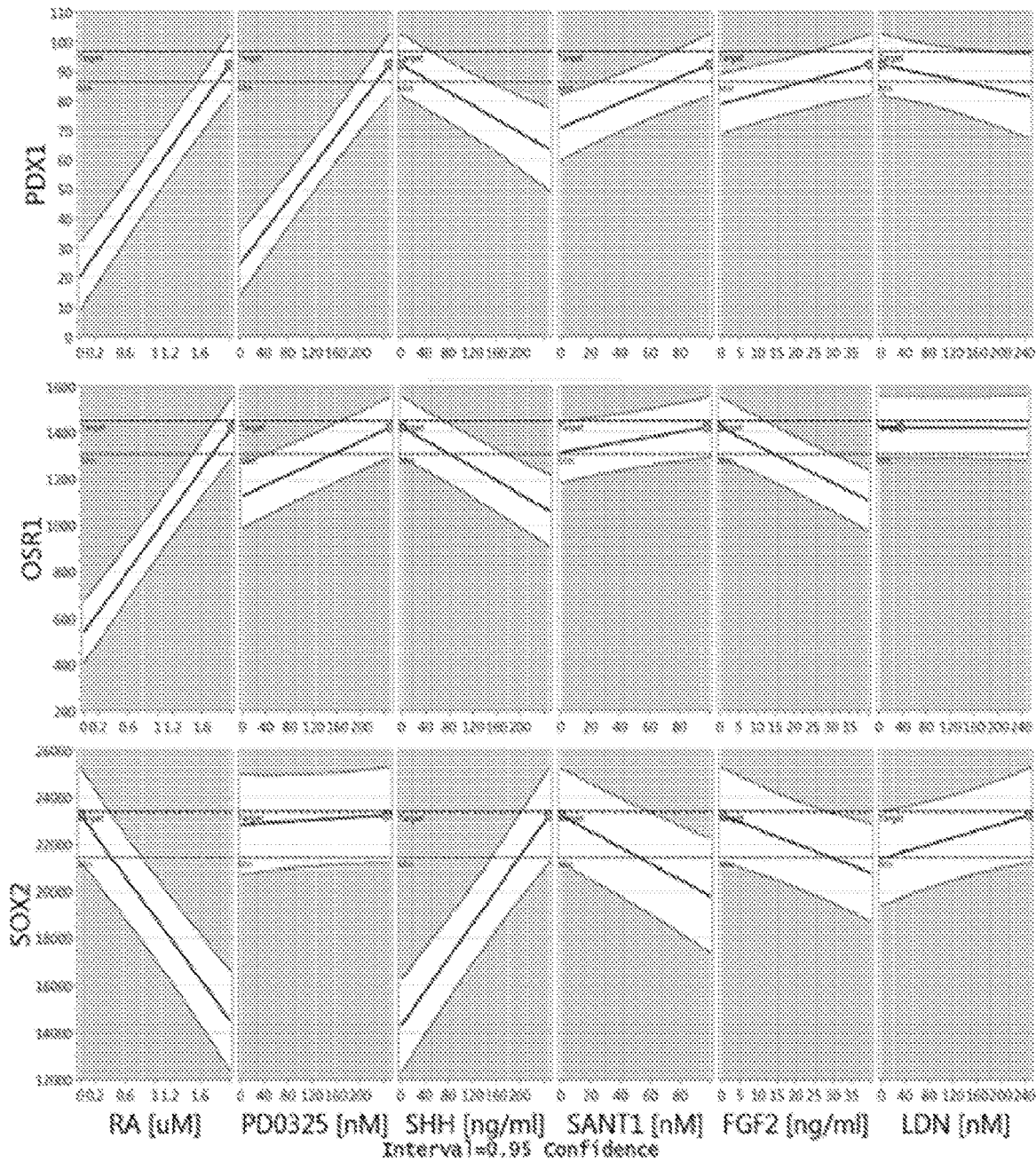
Figure 4:
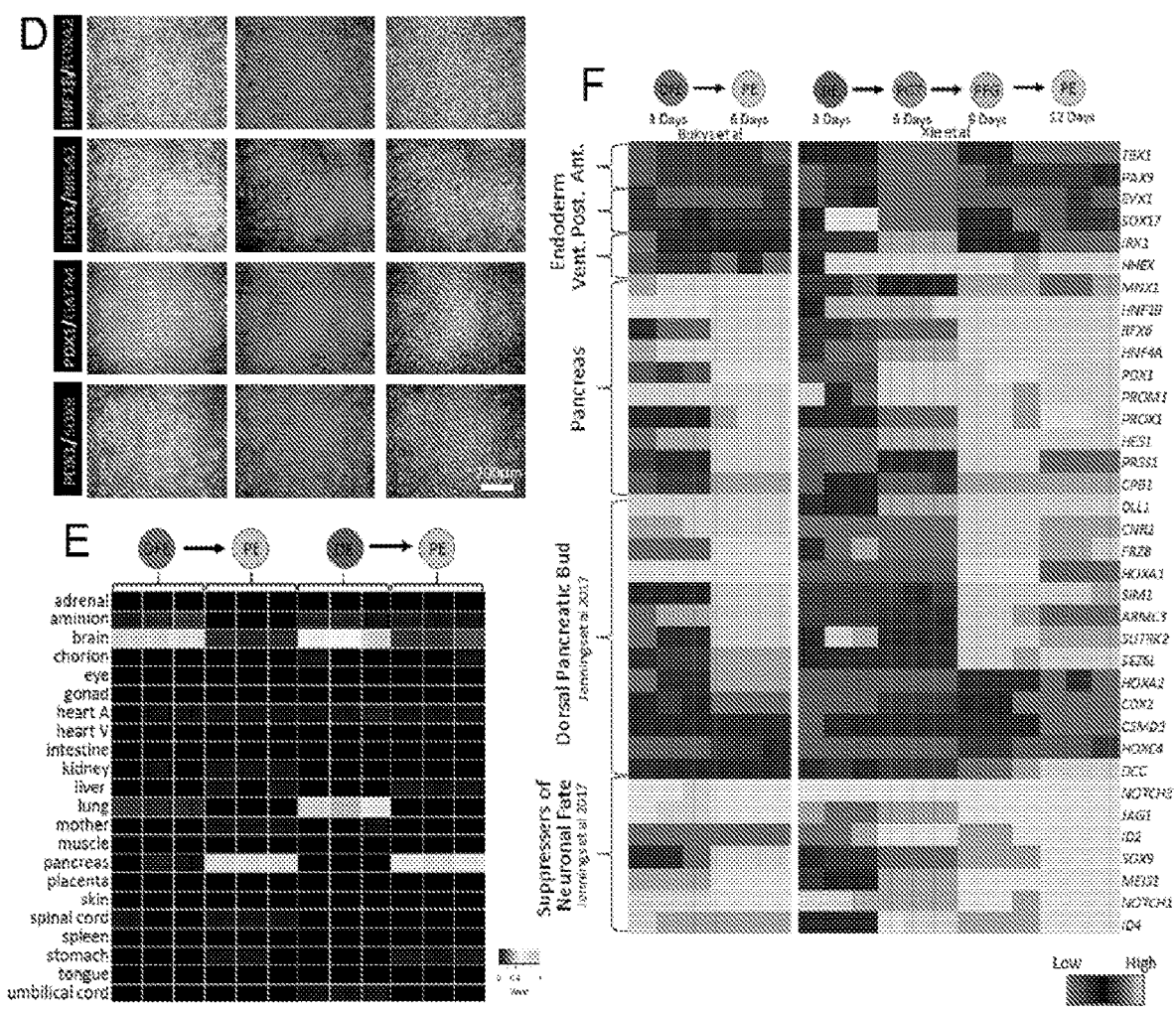

Results from ISPA maximization of the expression of SOX2, OSR1 or PDX1 were compared (FIGS. 4A & B). Dynamic profiling analysis (FIG. 4C) revealed that both OSR1 (gastric) and PDX1 (pancreatic) were under similar mechanisms of control. Both genes were strongly responsive to RA with FC=30.68 and FC=31.38 respectively (FIGS. 4B & C). However differential responsiveness to FGF signaling were predicted, with FGF4 predicted to be important for OSR1 (gastric) activation with a FC of 13.45 while MEK pathway inhibition was shown to strongly contribute to PDX1 activation with a substantial FC of 29.62 for the small molecule inhibitor PD0325901 (FIGS. 4B & C). Thus, the bi-potentiality of gastric/pancreatic fates is resolved by FGF/FGFi inputs, respectively. Of note, SOX2 expression was strongly decreased by RA and highly regulated by SHH with respective FC of −28.59 and 29.58 (FIGS. 4B & C). SOX2 is a continuing marker of the esophageal and fundic stomach, and thus lies immediately anterior to the PDX1-expressing gastric antral field in rodents (McCracken et al., 2014). Our data argue that retinoic acid secures a posterior antral field and active inhibition of SHH contributes to the down-regulation of SOX2 expression, hereby allowing for a switch from a gastric to a pancreatic field. This observation is supported by developmental studies in chick (Hebrok et al., 1998).

DFE derived Pancreas is of a Dorsal Identity

Figure 12:
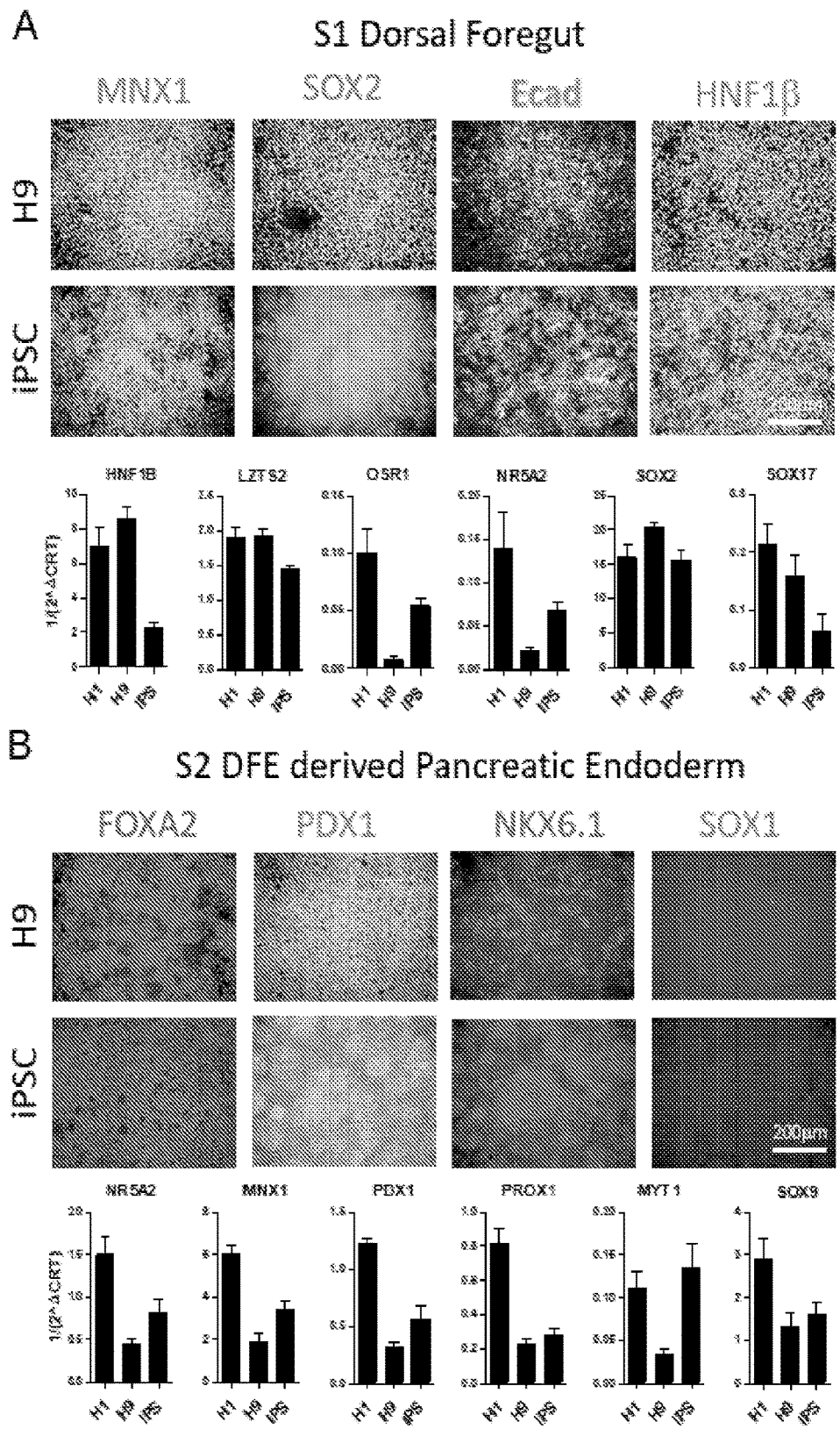
FIG. 12 shows results of robust and homogenous induction of pancreatic fate from DFE using iPSC and female hESC A: IHC validation of the HNF1$\beta^{opt}$ protocol between three different pluripotent cell lines with the corresponding expression levels of key factors up-regulated. B: IHC validation of the pancreatic induction from DFE between three different pluripotent cell lines with the corresponding expression levels of key up-regulated pancreatic factors.
Figure 13:
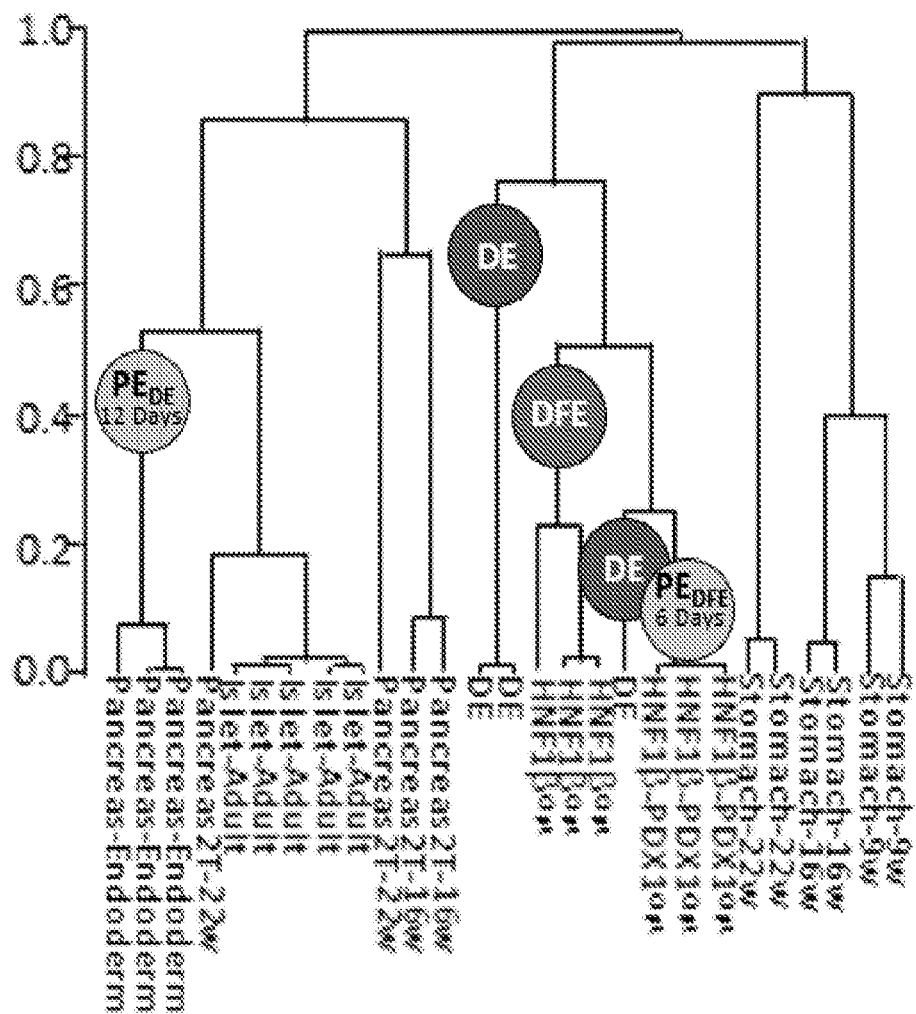
FIG. 13 shows hierarchical clustering comparing pluripotent derived cells to several primary tissues. Hierarchical clustering was performed on the KeyGenes data set in R. Since all pluripotent derived samples fell within the same cluster containing the human fetal stomach, fetal pancreas and adult islets samples only this region of the cluster is shown.

Using the ISPA-defined PDX1 optimizer conditions (shown in FIG. 4B), it was demonstrated that the PDX1-expressing DFE-derived PE cultures co-expressed several known pancreatic progenitor markers including FOXA2, NR5A2, GATA4 and SOX9 indicating that a true PE-state was rapidly induced (FIG. 4D). This DFE-derived pancreatic induction was shown to be reproducible in the H9 female embryonic stem cell line, as well as in iPSC culture (FIG. 12). An RNASeq-based KeyGenes analysis (Roost et al., 2015) was used to verify that this DFE-derived PDX1-induction was truly a pancreatic fate (FIG. 4E). We compared pancreatic endoderm (PE) derived from DFE to APS type DE-derived stage 4 PE as previously published (Xie et al., 2013). Interestingly, both of the starting populations DE and DFE cultures initially displayed a limited signature to brain, which was lost through the sequential stage in both protocols (FIG. 4E). This is likely attributable to emergent expression of neuronal fate suppressor genes (Jennings et al., 2017) which were activated during the sequential stage(s) in both populations (FIG. 4F). The published APS-derived DE population displayed similarity to lung while the DFE population did not (FIG. 4E). This is presumably because the lung buds are exclusively derived from ventral endoderm. A hierarchical clustering comparison between DFE, DE and their derived PE populations demonstrated that the DFE and DE population were so similar that the DFE population clustered in between the triplicate set of DE samples (FIG. 13), attesting that both ventral, and dorsal protocols attain a fundamental endodermal program. However, when comparing PE derived from either DFE or DE to genes highly enriched in the dorsal pancreas during human development (Jennings et al., 2017) we found that the DFE population already expressed several of these genes including DLL1, CNR1 FRZB, HOXA1, and ARMC3 whereas the APS-DE population displayed only low expression of CNR1 and FRZB. Also, expression of MNX1 (Hlxb9), a previously described dorsal marker, was expressed throughout the DFE culture whereas DE-derived PE only began have detectable MNX1 expression at the PFG stage (FIG. 4F). Subsequently, PE derived from DFE continued to express the vast majority of the dorsal-specific genes (FIG. 4F). When compared to current pancreatic DD protocol (Xie et al., 2013) we concluded that DE-derived PE adopted a pancreatic phenotype during the published 'PGT' stage as evident through the expression of HHEX, HNF1b, RFX6, HNF4A, PDX1, PROM1 and PROX1, but had no discernible dorsal identity until the cultures were exposed to retinoic acid at the 'PFG' stage. Considering the results of ISPA as described previously, while the present invention is not limited to any particular mechanism, and an understanding of the mechanism is not necessary to understand or practice this invention, this implies that the dorsal phenotype previously attributed to these protocols is a result of redirecting the population towards a dorsal fate late in the protocol.

Effective Induction of Endocrine Pancreas from DFE-Derived PE is Time Dependent

Figure 5:
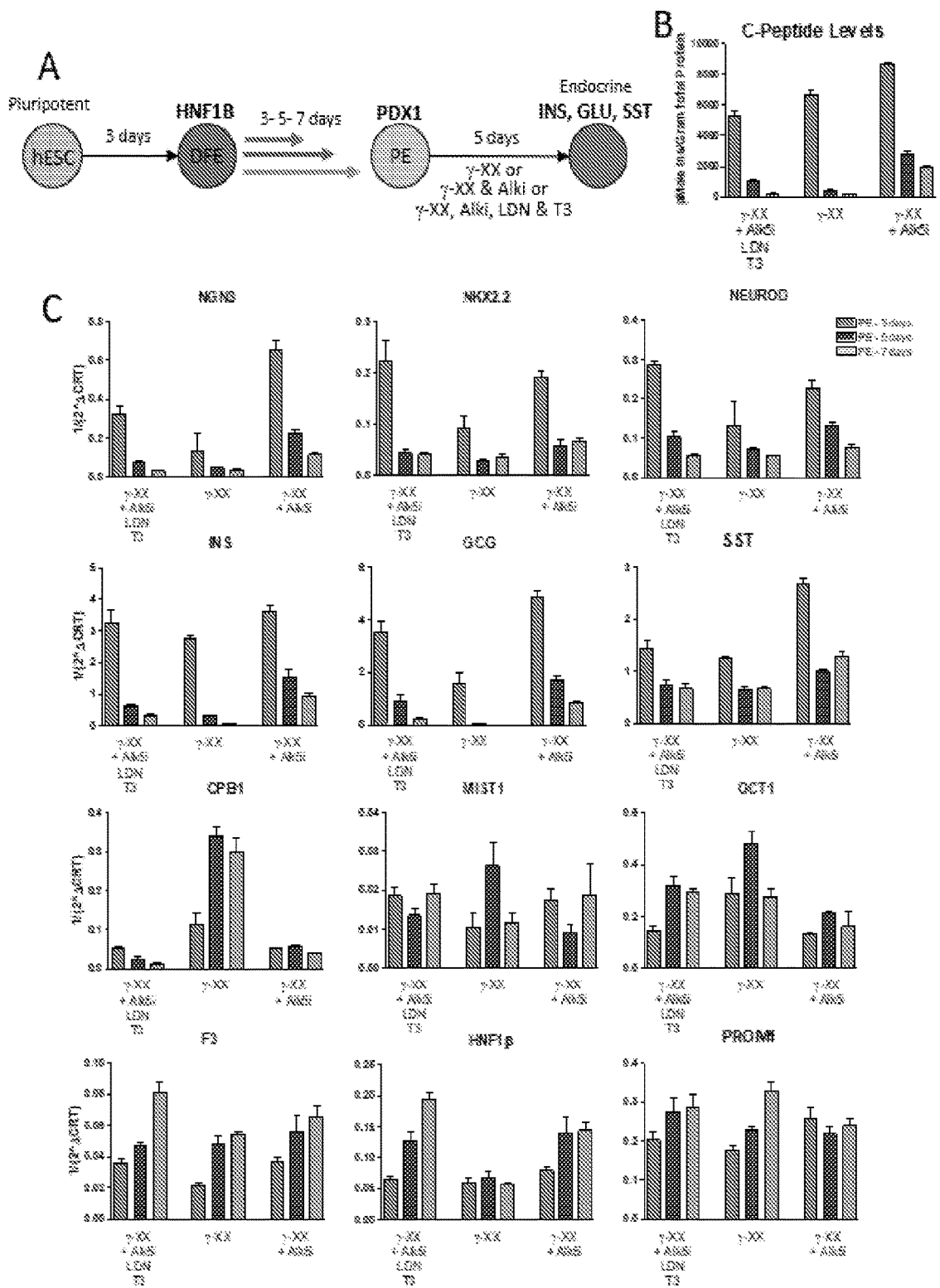
FIG. 5 shows the results of effective and rapid induction of pancreatic endocrine fate from pluripotency via DFE endoderm using small molecules A: Shows a schematic of the reactions performed varying the pancreatic induction. B: C-peptide levels detected throughout the different experimental conditions as determined through ELISA. C: QuantStudio based expression levels of several key pancreatic and endocrine specific genes as normalized to the average expression of GAPDH, TBP and YWHAZ.
Figure 14:
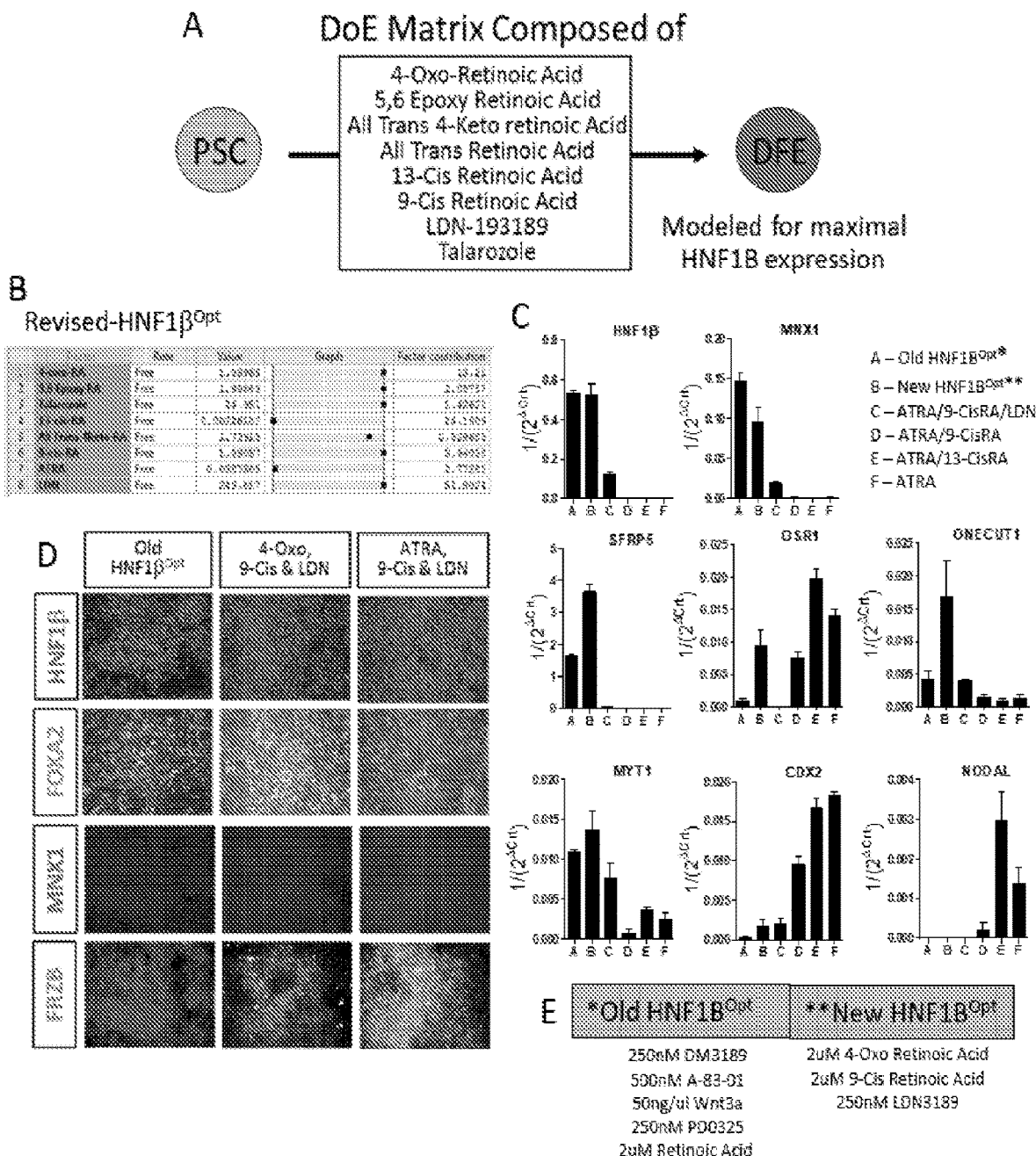
FIG. 14 shows retinoic acid metabolites are effective at activating dorsal foregut endoderm. A: Schematic showing the experiment performed. B: HNF1$\beta^{Opt}$ for experiment described in panel A. C: Graphs showing the differential effects different retinoids on activating select endodermal genes. D: Corresponding IHC validation comparing protein levels between original HNF1$\beta^{Opt}$ with conditions predicted in current experimental design. E: Additive compounds for reactions conditions referred to as old and new HNF1$\beta^{Opt}$.

To further validate the pancreatic progenitor identity we characterized the DFE-derived PE for forward differentiation potential towards terminal pancreatic fates using pancreatic lineage specific markers. The importance of NOTCH pathway inhibition for terminal differentiation of endocrine cells is well known (Jensen et al., 2000, Afelik et al., 2012) so we evaluated the temporal effects of NOTCH inhibition towards endocrine commitment using three media inputs as outlined in FIG. 5A, all including a NOTCH pathway inhibitor (g-secretase inhibitor XX), and evaluating single SMAD (Alk5 inhibitor), and Dual-SMAD inhibition (Alk5i/LDN). Regardless of conditions, these media were able induce endocrine differentiation. Single-SMAD inhibition appeared preferable to dual-SMAD inhibition, and absence of SMAD inhibition resulted in slightly increased acinar differentiation (FIG. 5B-C). Because multiple developing systems (somitogenesis, neural development, as examples) rely on total duration of NOTCH signaling, we varied the length-of-stay during pancreatic induction; a time when the NOTCH pathway would become active. Strikingly, prolonging the period of PE induction diminished endocrine competence. These data revealed that the culture progresses through a competence window after a PDX1 activation that—if extended—leads to a loss of endocrine fate (FIG. 5C) even under permissive endocrine induction conditions. Of note, increasing the duration at the PE stage led to an increase in the competence towards acinar, and finally, ductal differentiation. Acinar competence, as assayed through the expression of CPB1, and MIST1 (BHLHA15) was observed when PE cultures remained able to engage in NOTCH signaling for five days before being subjected to NOTCH inhibition (FIG. 5C). This implies that competence for endocrine lineages is temporally regulated first prior to acinar and subsequently, finally towards the ductal lineage (FIGS. 14A & 14C). Ductal differentiation, as observed through the expression of F3, HNF1β and PROM1 increased the longer the PE population was allowed to remain in the active NOTCH PE state (FIG. 5C), agreeing with NOTCH being permissive for ductal fate (Afelik et al., 2012).

Dorsal-Type PE-Derived β-Cells are Fetal-Like

Figure 6:
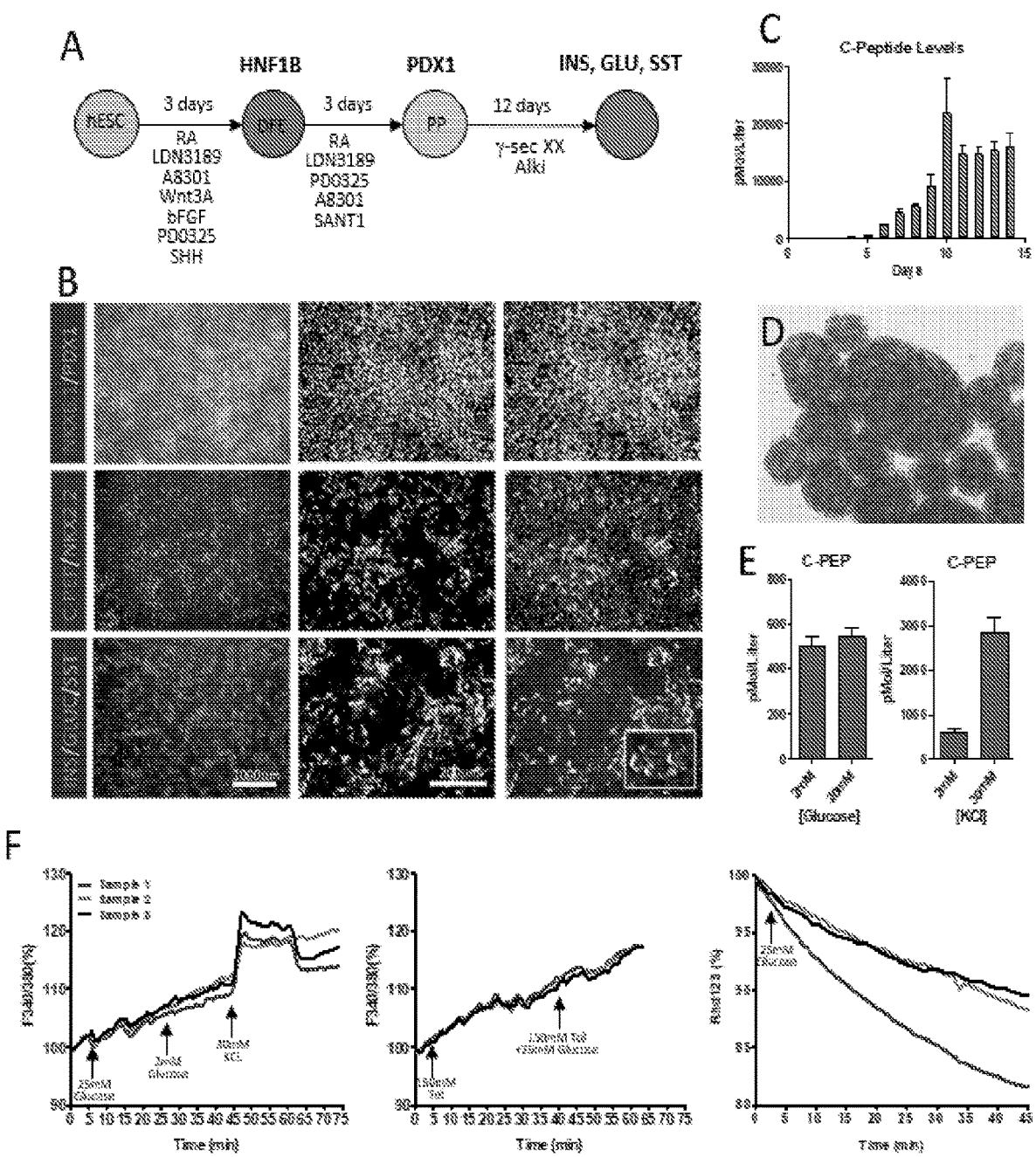
FIG. 6 show results that show that DFE derived endocrine cells have an immature phenotype. A: Schematic showing the directed differentiation protocol used to generate endocrine fields. B: IHC Evaluation of the end point culture for various endocrine specific factors. C: A 14-day endocrine induction was assayed daily for c-peptide generation through ELISA. D: Retention of dithizone by pluripotent derivatives grown as aggregates. E: Glucose stimulated insulin release assay (GSIS) evaluation of endocrine function of endocrine cultures. F: Microfluidic analysis of internal calcium release in response to glucose and potassium challenges.
Figure 7:
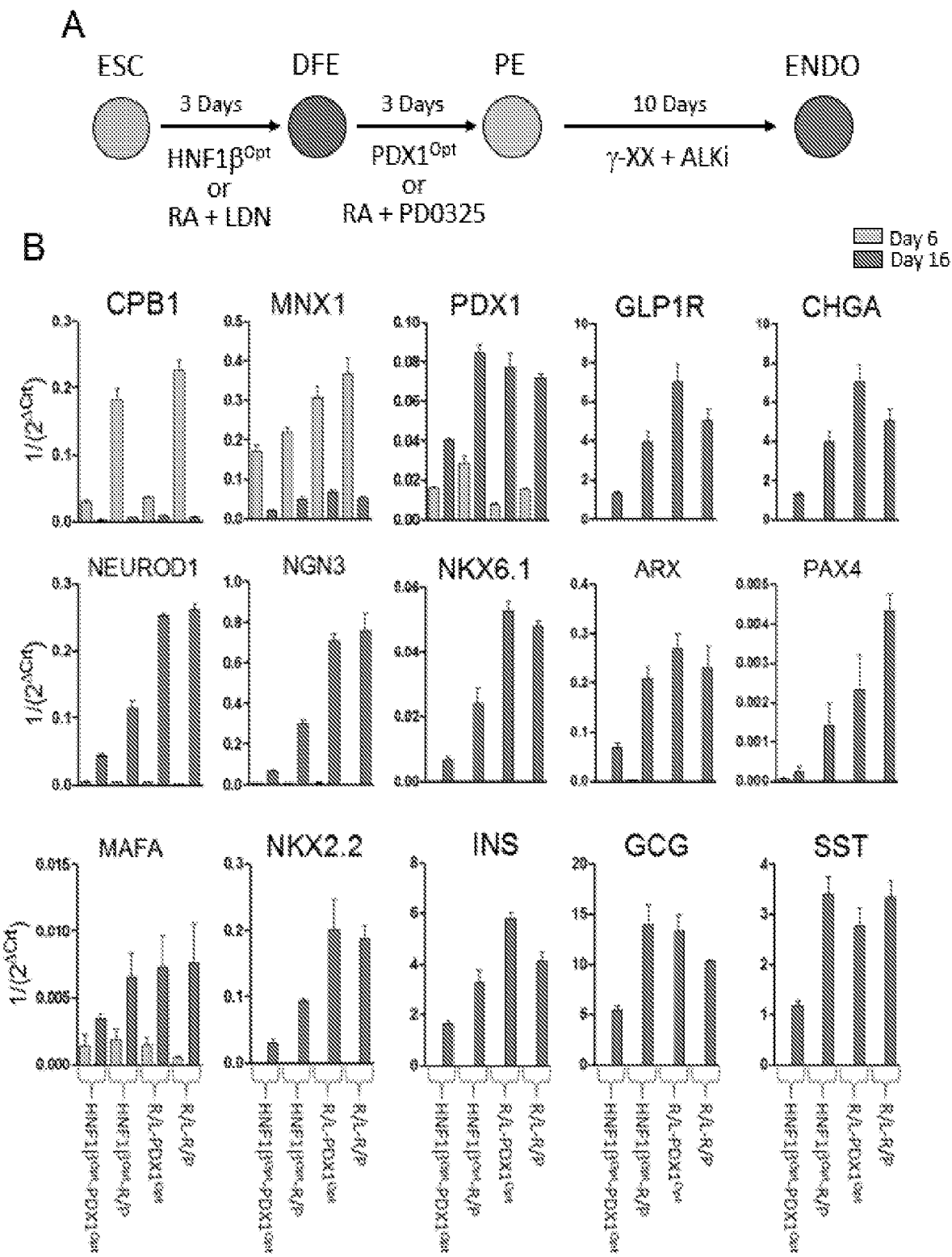
FIG. 7 shows the results of biological equivalence testing of small molecule based pancreatic endocrine induction protocols. A: shows a schematic of the reactions performed in which the HNF1β$^{Opt}$ and PDX1$^{Opt}$ were replaced with only the factors from the modeling experiment with the highest predicted factor contributions: retinoic acid and LDN3189 or retinoic acid and PD0325 respectively. B: shows a QuantStudio based transcript analysis of the 4 respective reaction conditions at either the PE stage (indicated in light grey) or the endocrine stage (indicated in dark grey) as normalized to the average expression of GAPDH, TBP and YWHAZ.

Accepting that the conditions for forward differentiation to endocrine fate were mainly relying on NOTCH signaling inhibition and had not been optimized using the QbD approach, we inspected the resulting endocrine output, and also determined the maturation state. Using the short duration PE-state (FIG. 6A) we found that PDX1+/NKX6.1+co-expression, a cell state representative of a TrPC pro-endocrine cell and necessary for generating a functional beta cell, occurred throughout the culture (FIG. 6B). In humans, but not mice, NKX2.2 is beta cell specific and not expressed by MPCs. NKX2.2 was co-expressed with insulin C-peptide within patches throughout the culture. Furthermore, Induction of multiple endocrine products were observed with cells co-expressing INS+/GCG+ or INS+/SST+(FIG. 6B). C-peptide production increased the longer the cultures was exposed to Notch inhibition with maximum levels occurring after 10 days and leveling off afterwards (FIG. 7C). Cellular aggregates demonstrated dithizone retention, and consequently $Zn^{2+}$ loading (FIG. 6D). When challenged for insulin secretion, KCl-induced a 4-fold increase in detectable C-peptide levels, but a glucose challenge (2 mM>20 mM) did not induce C-Peptide secretion (FIG. 6E). Microfluidics evaluation of endocrine derived cultures showed a detectable calcium influx of approximately 6% (FIG. 6F); again absence of a glucose response was observed. The results from the classical GSIS and microfluidic analysis assays were consistent and demonstrated an immature β-cell physiology capable of synthesizing and storing insulin, but with limited functional profile when responding to glucose fluctuations, characteristic of a fetal-like β-cell state previously observed from APS-DE derived β-cells (Hrvatin et al., 2014).

A Small-Molecule Method for the Induction of Fetal-Like β-Cells

Inspection of the $PDX1^{Opt}$ conditions identified that retinoic acid and PD0325 had the highest factor contributions of 31.38 and 29.62 respectively (FIG. 7A) while all other effectors tested had low factor contributions <10. Seeking to achieve a minimally complex method for pancreatic endocrine cell induction we combined such components for DFE induction (RA and LDN ((R/L)) with the important components of the $PDX1^{Opt}$ (RA and PD0325 ((R/P)), concluding with a conversion to endocrine fate using NOTCH and ALK5 inhibition. First, following DFE induction using HNF1(3° Pt followed by R/P significant increases in pancreatic markers assayed were observed and this increase was amplified when followed by an endocrine induction (FIG. 7B). A further increase in pancreatic genes was observed when the $HNF1β^{Opt}$ was replaced with the use of the (R/L) step. Using the R/L step, followed by $Pdx1^{opt}$ conditions generated the highest levels of the pancreatic genes INS, GCG, NKX6.1, CHGA, GLP1R and PDX1 (FIG. 7B). Yet, comparative changes were observed when both the $HNF1β^{Opt}$ and $PDX1^{Opt}$ were replaced with R/L and R/P in conjunction. Slight decreases in INS, GCG, NKX6.1, CHGA, GLP1R and PDX1 expression were observed under these conditions, however moderate compensatory increases were observed in the expression of NEUROD1, NGN3, PAX4, MAFA and SST. We conclude directed differentiation of pluripotent cells to fetal β-cells can be rapidly attained through three sequential stages using five small molecules: RA, LDN3189, PD0325901, gamma-XX and A8301.

We have demonstrated a new protocol capable of rapidly converting pluripotent cells into a regionalized endodermal population (DFE). This endodermal population is competent to form dorsal pancreatic progenitors and undergoing endocrine conversion through a 3-stage protocol relying on the use of only five small molecules.

RNA-Seq data demonstrated that the DFE is of a dorsal character based on multiple genes. Jennings et al. investigated dorsal vs. ventral identity of the pancreas during human development and showed that a defined set of 13 genes could discriminate between the dorsal and ventral pancreas. As a basis for our interpretation, the DFE population agreed with a dorsal fate. Administration of retinoic acid at a later stage was employed to instill this dorsal-aspect onto the APS-DE. For the DFE, the dorsal identity carries forward to pancreas, and this state is permissive for induction of all pancreatic lineages. Previous studies have demonstrated that DE suffers from hepatic stray fates (Mfopou et al., 2010), whereas DFE-derived pancreas does not, although we note that it is bi-potential for antral stomach induction. This is expected as the ventral pancreas has a bi-potential competency for liver induction (Angelo et al., 2012, Deutsch et al., 2001, Tremblay and Zaret, 2005, Bort et al., 2004). Early, lateral plate derived BMPs instruct this precursor towards hepatic fates (Chung et al., 2008), and PE treated with BMP4 also induced hepatic genes. In contrast, ISPA analysis suggested that SHH and retinoic acid were important process inputs impacting the bi-potential pancreatic/gastric progenitor. These findings are in agreement with previous studies of dorsal pancreas specification in the chick (Hebrok et al., 1998). Regardless of the dorsal/ventral origin of the endodermal population, both DFE and APS-DE readily give rise to pancreatic endoderm capable of generating endocrine cells. As observed for APS-DE derived cells, the DFE-derived endocrine cells are functionally more similar to fetal β-cells than to fully mature glucose responsive β-cells.

Material and Methods

Cell Culture

Pluripotent cultures were adapted to Essential 8 media (Gibco A15169-01) and grown on vitronectin (Gibco A14700) coated plates (Corning Inc. 3598). Differentiation experiments were seeded at 75,000 cells per $cm^2$ and maintained in E8 medium for 48 hours until cultures were approximately 90% confluent before initiating differentiation. All growth factors and small molecules were reconstituted according to supplier's recommendations and aliquots were stored at −80° C. for up to a year. Growth medium was changed daily and with the exception of the DE protocol the basal medium used in all differentiation experiments was CDM2 (Loh et al., 2014). The $APS^{Opt}$ was composed of 250 nM LDN3189 (Sellekchem S2618), 50 ng/ml Activin A (Peprotech 120-14), 20 ng/ml bFGF (Gibco 13256029), 100 nM Sant1 (Sellekchem S7092). The $HNF1β^{Opt}$ was supplemented with 250 nM LDN3189, 500 nM A8301 (Biogems 4463325), 12.6 ng/ml Wnt3a (R&D 5036WN/CF), 25 ng/ml bFGF, 250 nM PD0325 (Selleckchme S1036), 40 ng/ml SHH (Peprotech 100-45) and 2 uM retinoic acid (Sigma Aldrich R2625). DE was generated using conditions previously described (Rezania et al., 2014, D'Amour et al., 2005). The PDX1$^{Opt}$ was composed of 500 nM A8301, 250 nM LDN3189, 100 nM Sant1, 250 nM PD0325, 2 uM retinoic acid and 1% B27 supplement (Gibco 12587) and with the exception of where it is stated differently in the text was used for 3 sequential days on differentiating cells. Endocrine push medium was supplemented with 100 nM gamma-secretase inhibitor XX (EMD Millipore 565789) and 500 nM A8301. Stomach organoids were generated using a modified protocol (McCracken et al., 2014). Briefly HNF1β$^{Opt}$ cultures were incubated for three days with a stage 2 medium supplemented with 500 ng/ml Wnt3a, 500 ng/ml FGF4 (R&D 7460-F4), 250 nM LDN3189 and 2 uM retinoic acid (RA first day only). Cultures were passaged 1:6 with seeding occurring in a 1:4 Matrigel (Fisher Scientific 354230)/CDM2 mixture and incubated for 30 minutes at 37° C. before a three day application of stage 3 medium composed of 2 uM retinoic acid, 250 nM LDN3189 and 100 ng/ml EGF (R&D 236-EG). Cultures were then supplemented with a stage 4 medium supplemented with 100 ng/ml EGF for 23 days before organoids were recovered and fixed for sectioning.

Computer Modeling

All DoE experimental designs were computer generated using D-optimal interaction designs in MODDE software (Sartorius Stedim Data Analytical Solutions, SSDAS). Perturbation matrixes were generated (96 independent experimental runs) on a Freedom Evol50 liquid handling robot (TECAN, CH). Each DoE differentiation experiment used a 3-day application of perturbation matrixes with daily media replacements. All cell culture, including manual preparatory expansion and seeding as well as any robotic manipulations were contained in a modular X-Vivo system (Biospherix, NY, USA) providing Process Analytical Technology (PAT) of the cell culture conditions (affording % $N_2$, % $O_2$, % $CO_2$, and temperature control and monitoring at any point in the experimental process). End-point data collection was performed using an Open Array RT-QPCR method (QuantStudio, Life Technologies, 53 genes/sample/card). QuantStudio gene expression data were normalized within Expression Suite™ (Life Tech), standardized, and exported to MODDE. Mathematical modeling of the differentiation space was performed in MODDE using PLS maximizing the explained variance and subsequently gene-specific models were tuned by Q2 maximization. Fitted model optimized conditions for response maximization or minimization were extracted using the software predictive tools 'optimizer' and 'dynamic profile' analysis. Virtual experiments were performed in the known space covered by the experimental design, addressing pathway relative contributions to the desired parameters.

RNA and cDNA Preparation

RNA extractions for modeling analysis were performed using a MagMax-96 Total RNA Isolation Kit (Life Technologies AM1830) and performed according to manufacturer's protocol. Reverse transcription of RNA samples was performed using the reaction conditions provided with the High Capacity cDNA RT Kit (Life Technologies 4368814). RNA extractions for RNA Seq and QRT-PCR validation were performed in quadruplicates with RNA extractions occurring using a Trizol (Life Technologies 15596018) based method. For OpenArray validation (not modeling) cDNA was then subjected to QuantStudio analysis. The resulting data was then normalized to housekeeping genes and graphed using GraphPad Prism 5.02 software.

QRT-PCR for Modeling Analysis.

Samples were loaded onto a custom design Quant Studio Card using an OpenArray AccuFill System (Life Technologies 4471021) and ran on a QuantStudio 12k Flex Real-Time PCR System (Life Technologies 4471090). The QuantStudio Open Array analysis provided expression information of 53 chosen genes per open array configuration. The resulting data underwent QC assessment in ExpressionSuite to remove any genes that failed to amplify and were normalized against three internal standards (internal standards were changed between designs). Initial designs included genes responding to all major sub-lineage fates downstream of pluripotency, while the later design focused more on endodermal lineages with an emphasis on pancreatic fates. For all Open Array designs used primer/TaqMan probesets per platform provided typical confidence amplification (Cq Conf.) scores of 0.975 and above. Each modeling experiment generated 10,000 individual gene expression response data points on which MODDE optimization was based on.

Immunohistochemical Analysis of Cultures

Histological characterization occurred by treating cell cultures with 4% paraformaldehyde (EMD 30525-89-4) solution at ambient temperature for 15 minutes. Samples were then blocked and permeabilized using 0.1M Tris/HCl (Promega H5123) pH 7.5 supplemented with 0.5% blocking reagent (Perkin Elmer FP1012) and 0.1% TritonX-100 (Fisher Scientific BP151) for 1 hour. All antibody solutions were diluted in 0.1M Tris/HCl (Promega H5123) pH 7.5 and primary antibodies were incubated over-night while secondary antibodies were incubated for an hour. All incubations occurred at ambient temperature. Cultures were treated with a 1:2 dilution of Vectashield mounting medium (Vector Laboratories H-1200). The specific antibodies and the dilutions used are provided in Table 1.

TABLE 1

Primary Antibodies

| Antigen | Host | Supplier | Catalogue Number | Dilution |
|---|---|---|---|---|
| C-peptide | Rat | DSHB | GN-ID4 | 1:500 |
| Ecad | Rat | Invitrogen | 13-1900 | 1:500 |
| FOXA2 | Goat | Santa Cruz Biotechnologies | sc-6554 | 1:200 |
| Gata4 | Mouse | Santa Cruz Biotechnologies | sc25310 | 1:200 |
| Gata6 | Rabbit | Santa Cruz Biotechnologies | sc-9055 | 1:200 |
| Glucagon | Mouse | Sigma | G2654 | 1:500 |
| HNF1 ® | Rabbit | Santa Cruz Biotechnologies | sc-22840 | 1:200 |
| Insulin | Guinea pig | Dako | A0564 | 1:200 |
| MNX1 | Rabbit | Invitrogen | PA5-23407 | 1:200 |
| MUCIN1 | Rabbit | Cell Signaling | 1416T | 1:200 |
| NKX2.2 | Rabbit | Abcam | ab191077 | 1:500 |
| NKX6.1 | Mouse | R&D | MAB5857 | 1:500 |
| NR5A2 | Rabbit | Abcam | AB189876 | 1:200 |
| OSR1 | Rabbit | Cell Signaling | 3729S | 1:200 |
| PDX1 | Goat | R&D | AF2419 | 1:200 |
| SOX1 | Goat | Santa Cruz Biotechnologies | sc-17318 | 1:200 |
| SOX2 | Rabbit | Millipore | AB5603 | 1:1000 |
| SOX9 | Rabbit | Millipore | AB5535 | 1:200 |
| SOX17 | Mouse | R&D | MAB1924 | 1:100 |
| SST | Rabbit | Dako | A0566 | 1:500 |

TABLE 1-continued

Secondary Antibodies

| Antibody | Supplier | Catalogue Number | Dilution |
|---|---|---|---|
| 488-Donkey-a-Goat | Jackson Immuno Research | 705-546-147 | 1:200 |
| 488-Donkey-a-Mouse | Jackson Immuno Research | 715-546-151 | 1:200 |
| 488-Donkey-a-Rabbit | Jackson Immuno Research | 711-546-152 | 1:200 |
| 488-Donkey-a-Rat | Jackson Immuno Research | 712-545-150 | 1:200 |
| 594-Donkey-a-Goat | Jackson Immuno Research | 705-515-003 | 1:200 |
| 594-Donkey-a-Guinea Pig | Jackson Immuno Research | 706-586-148 | 1:200 |
| 594-Donkey-a-Mouse | Jackson Immuno Research | 715-585-150 | 1:200 |
| 594-Donkey-a-Rabbit | Jackson Immuno Research | 711-586-152 | 1:200 |
| 594-Donkey-a-Rat | Jackson Immuno Research | 712-586-153 | 1:200 |
| 647-Donkey-a-Rabbit | Jackson Immuno Research | 711-605-152 | 1:200 |
| Cy5-Donkey-a-Rat | Jackson Immuno Research | 712-175-153 | 1:210 |

Cultures were generally stained within the TC culture vesicle they were differentiated in while aggregates or organoids were fixed and embedded in OCT (Sakura 4583) followed with cryostat sectioning before staining.

Endocrine Cell Characterization

GSIS assays were performed by incubating cells in Krebs-Ringer buffer supplemented with 2 mM glucose for 30 minutes for determination of basal C-peptide levels. This was followed by changing reaction buffer to a Krebs Ringer buffer either supplemented with 20 mM glucose or 30 mM KCl for an additional 30 minute incubation. Buffer samples were collected and C-Peptide levels were quantified using ELISA (Mercodia 10-1141-01) according to manufacturer's protocol. Microfludic assays were performed as previously described (Adewola et al., 2010, Wang et al., 2012).

RNA Seq & Key Gene Analysis

RNA samples were sequenced by the University of Chicago Genomics Core. FASTQ files were aligned against the reference hg19 using HISAT2 version 2.0.5 software. Gene counts for the aligned reads were produced by HTSeq version 0.8.0 using RefSeq annotation file. Differential expression analysis was performed using edgeR version 3.18.1 with a cutoff of 4 counts per million. KeyGenes analysis was performed using a provided training set according to published protocol (Roost et al., 2015). Hierarchical clustering was conducted using RStudio software with R packages gplots and ggplot2 on 87 KeyGenes classifier genes with only the portion containing all the hESC derivatives shown. Differential expression was determined with the EdgeR package and heatmaps were generated using Microsoft Excel software.

Example 2

Generating DFE Cells Using Retinoid Compounds

This Example describes the generation of dorsal foregut endoderm cells from pluripotent stem cells using retinoids with known bioactivity. This example also describes how endoderm is patterned during gastrulation through the cooperative activity of TGFb agonism, TGFb inhibition and retinoid agonism.

Results

Retinoic acid is generated in the body through a series of sequential enzymatic oxidation reactions transforming retinol into retinal and finally into retinoic acid. It is generally accepted that all-trans retinoic acid is the biologically relevant form of the molecule, however due retinoic acids long conjugated backbone it exists in many isomeric forms. Three prevalent isoforms have been observed in circulation; 7-cis retinoic acid, 13-cis retinoic acid and all trans retinoic acid and the serum ratios of these different isomers have been shown to be consistent overtime. Experiments using liver lysates have suggested that the conversion between these different isomers is enzymatically regulated, however the enzymes responsible for these conversions have not been positively identified. Studies have shown that these isoforms have differential binding infinities for RARs and RXRs. When retinoic acid is produced in or enters a cell it induces the production of Cyp26a, an enzyme that converts retinoic acids into 4-oxo-retinoic acids. While it was initially believed that production of 4-oxo-retinoic acid was an inactivation, several studies have shown that these 4-oxo-retinoic acids have differential binding affinities for several retinoic acid targets. Altogether, this suggests that different retinoic acid isomers may have unique biological activities.

When retinoic acid is used in directed differentiation protocols the chosen form used is all trans retinoic acid, however this molecule is highly unstable and rapidly degrades over time or when exposed to light. Both time and light can create a mixture of the different isoforms and produce epoxy and keto forms of retinoic acid. These epoxy and keto retinoic acid derivatives have been shown to have biological activity and affinity for retinoic acid binding sites. All together this creates several potential biologically active molecules with different differentiation potential when using retinoic acid in in vitro experiments. To establish which retinoic acid isoforms and derivatives are capable of inducing dorsal foregut endoderm a DoE-based ISPA approach was used.

BMP Inhibition in the Presence of 4-Oxo and 9-Cis-Retinoic Acid Induces DFE

A DoE designs encompassing several known biologically active retinoids was created as shown in FIG. 14A. When ISPA-based optimization was performed (FIG. 4B) it was predicted that several of the retinoids tested contributed to HNF1β induction. It was predicted that both 13-cis retinoic acid (significant at FC=24.1609) and all trans retinoic acid (low significance at FC=2.77281) actually had a negative contribution to HNF1β induction whereas the enzymatic degraded form of retinoic acid, 4-oxo-retinoic acid (FC=13.21), had the highest factor contribution of all the retinoids tested (FIG. 4B). To validate the ISPA transcript analysis for several key DFE genes was performed. It was shown that a new optimizer composed of the two retinoids predicted to have the highest contribution factors in the presence of LDN193189 could activate HNF1β to the same levels as the original HNF1β$^{Opt}$ (FIGS. 14C & D). The phenotype of this new HNF1β$^{Opt}$ was further confirmed through the activation of several previously described DFE markers including MNX1, SFRP5, OSR1, ONECUT1, MYT1, FOXA2 and FRZB (FIGS. 14C & D). Replacing 4-oxo-retinoic acid with newly reconstituted retinoic acid was able to activate several of the DFE genes, though to a significantly lower level. When LDN193189 was removed from the differentiation medium formulation it was shown that most DFE gene markers were not activated, however it was noted that several endodermal genes could be activated (OSR1, ONECUT1, MYT1, CDX2 and data not shown)

using retinoids including the gastrulation gene NODAL (FIGS. 4C & D), suggesting that endoderm patterned differently was being induced.

All Isomers of Retinoic Acid can Induce NODAL Signaling

Figure 15:
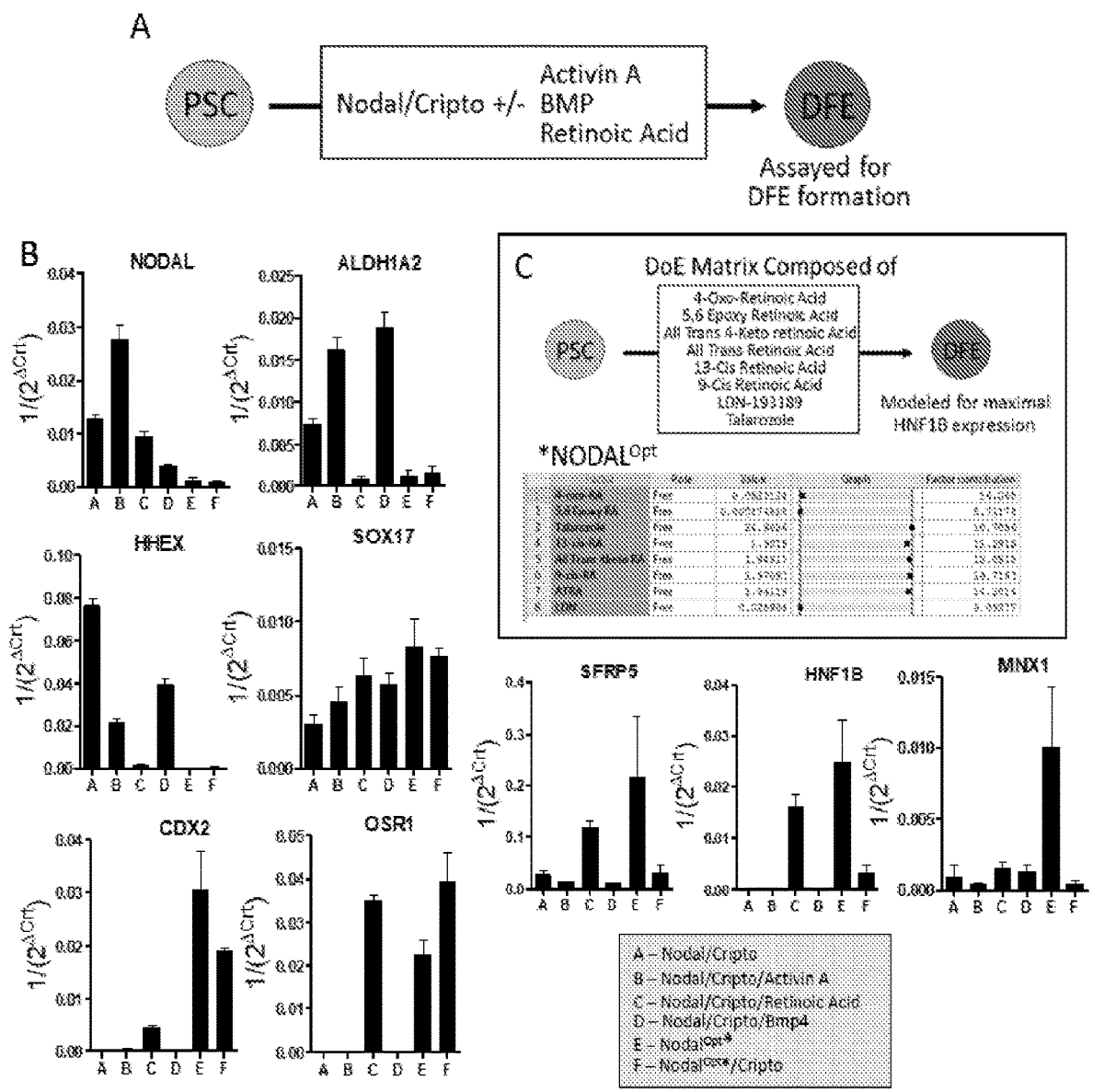
FIG. 15 shows all trans retinoic acid activates Nodal. All trans retinoic acid and retinoic acid metabolites have differential capacities for activating the primitive streak marker Nodal. A: Schematic of the experiment performed. B: Relative expression of selected endodermal genes compared a retinoid-based induction. C: Schematic showing the experiment performed to obtain the retinoid based NODAL$^{opt}$ conditions.

Most directed differentiation protocols generate endoderm using Activin A as a Nodal mimic to induce an in vitro gastrulation event, however during normal embryogenesis primitive streak formation is initiated with Nodal not Activin A. Previous studies have shown that Nodal and activin A signaling are not equivalent and that definitive endoderm generated through Nodal signaling is different from that generated by Activin A. Since our ISPA models for retinoid signaling predicted that retinoic acids in the absence of BMP-inhibition were capable of activating NODAL, we next evaluated the NODAL induced endoderm formation to a retinoic acid induction of NODAL. Reactions using a NODAL and CRIPTO (NODAL's binding partner) supplemented differentiation medium in the presence of either BMP4, Activin A or retinoic acid were compared to our ISPA based NODAL$^{Opt}$ (FIG. 15A). It was noted that all of the reactions tested were capable of inducing the early and mid-gastrulation markers NODAL and ALDH1A2 respectively, though the lowest levels were observed in the cultures exposed to the NODAL$^{Opt}$ (FIG. 15B). Consistent with previous observations the ventral marker HHEX was induced in all reactions lacking retinoic acid, however the highest induction of the classic definitive endoderm marker SOX17 occurred in cultures exposed to retinoic acids based NODAL$^{OPt}$ (Fig. B & C). All differentiation reactions supplemented with retinoic acids displayed the highest induction of the DFE markers HNF1β, MNX1, SFRP5 and OSR1, though obtained levels were an order of magnitude lower in the absence of BMP inhibition (FIG. 15B).

To better understand how the in vitro produced endodermal populations being studied are patterned we next performed a follow-up DoE-based gastrulation modeling experiment (FIG. 16A). ISPA optimizing for all the individual endoderm genes measured were then subjected to a cluster analysis using Seurat R package (FIG. 16B). This analysis split all optimizers into four different groups consisting of a single cluster containing DFE as patterned by retinoic acid and LDN193189 (FIG. 16C & FIG. 17). Another cluster was patterned by Nodal/Bmp4 and was composed of endoderm patterned mostly towards anterior and midgut fates, though the hindgut marker CDX2 was elevated in this cluster (FIG. 16C & FIG. 17). The cluster patterned by Nodal/Activin A consisted of endoderm patterned towards ventral and posterior fates (FIG. 16C & FIG. 17). When considering the factor contribution for the individual genes assayed throughout this experiment it is noted that anterior and dorsal (with the exception of GSC) genes generally are not activated in the presence of Activin A (FIG. 17). And while several of these anterior or dorsal endodermal genes are predicted to be activated through the synergistic effects of Nodal/retinoic acid or Nodal/BMP, it is important to note that the gene markers of DFE, HNF1b, MNX1, HNF6, OSR1 and SFRP5, are best induced using retinoic acid in the absence of Nodal.

CONCLUSION

While the NODAL$^{Opt}$ has strong contribution factors for all biologically relevant isomers of retinoic acid (9-cis, 13-cis and all trans) it also has a significant factor contribution for the cyp26a1 inhibitor talarozole ensuring that the catalytic conversion to their respective 4-oxo forms does not occur (FIG. 15A). This is in contrast to the HNF1β$^{Opt}$ where neither the 13-cis nor the all-trans form of retinoic acid are tolerated, but the 4-oxo metabolite and 9-cis are needed (FIG. 14B). All together this suggests that while retinoic acid is capable of inducing a DFE phenotype in both a Nodal-dependent, in the case where isomers of retinoic acid are used, or a Nodal-independent manner, in the case where 4-oxo-retinoic acid is used, the optimal induction of DFE occurs after retinoic acid is enzymatically degraded to 4-oxo-retinoic acid. This implies that the original HNF1β$^{Opt}$ may occur through an unneeded transient NODAL induction, however once retinoic acid induces cyp26a1 any Nodal production will stop. All together this shows that optimal DFE induction occurs in the absence of Nodal signaling.

Example 3

Validation of DFE Optimizer Conditions Using Immunohistochemistry

To further validate the induction conditions for DFE markers, immunostaining was performed, followed by high content imaging to assess conversion efficiency. Here testing alternative agonists for the retinoic acid pathway, we demonstrate that utilizing a mixture of 4-oxo-retinoic acid together with 9-cis retinoic acid is as effective as the complete HNF1β$^{Opt}$condition. Also, the photo-stable RA-agonist, EC23 operates equivalently to RA, and 4-Oxo/9-cis conditions.

Example 4

Figure 16:
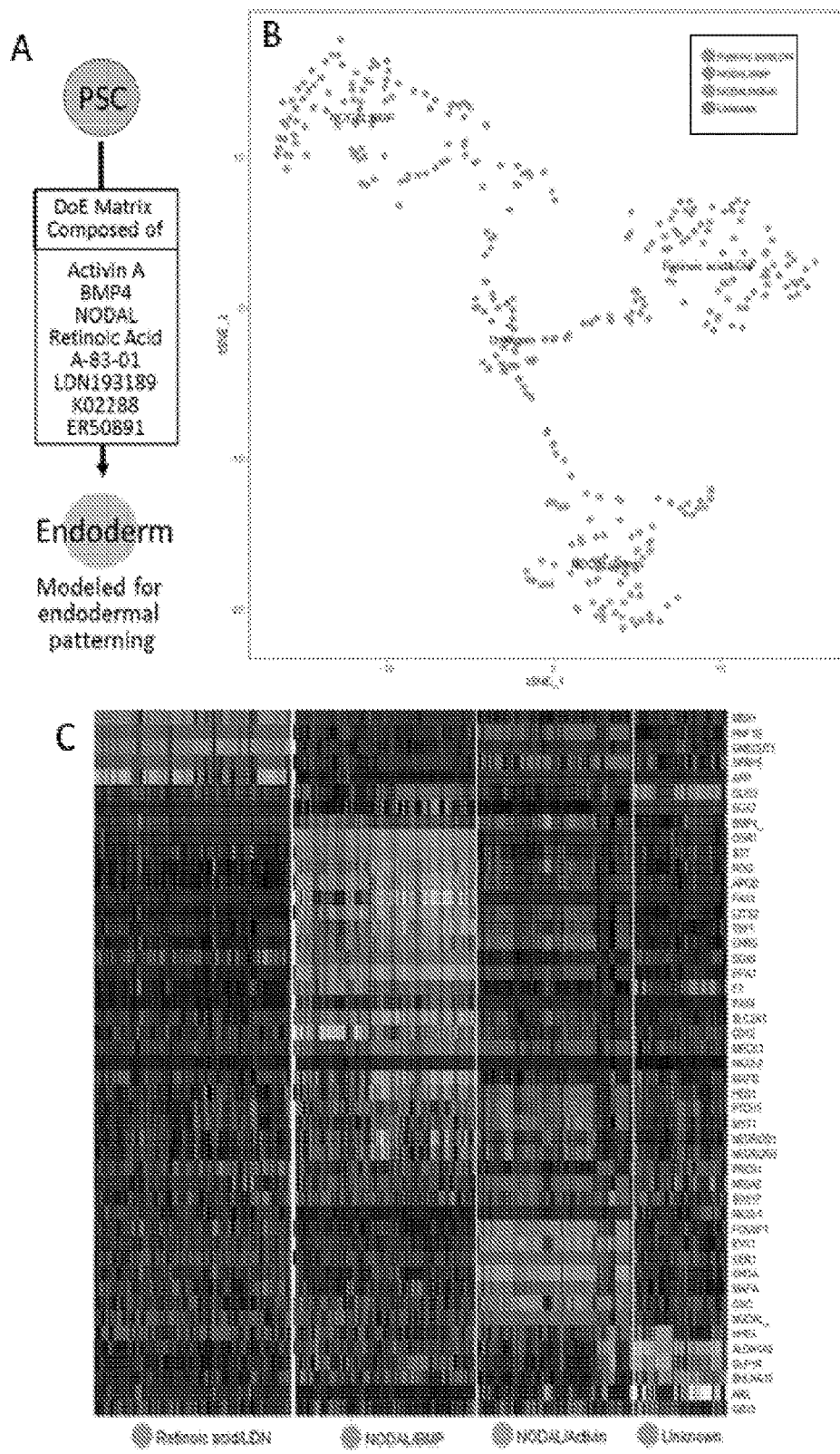
FIG. 16 shows patterning of endodermal fate space through initiating gastrulation. A: PSC cultures were exposed to a DoE defined matrix of compounds known to either initiate or inhibit gastrulation. B: A tSNE plot of all optimizers obtained for endodermal genes assayed. C: A corresponding heatmap showing which genes are segregated to each of the four determined populations shown defined in the tSNE plot.
Figure 18:
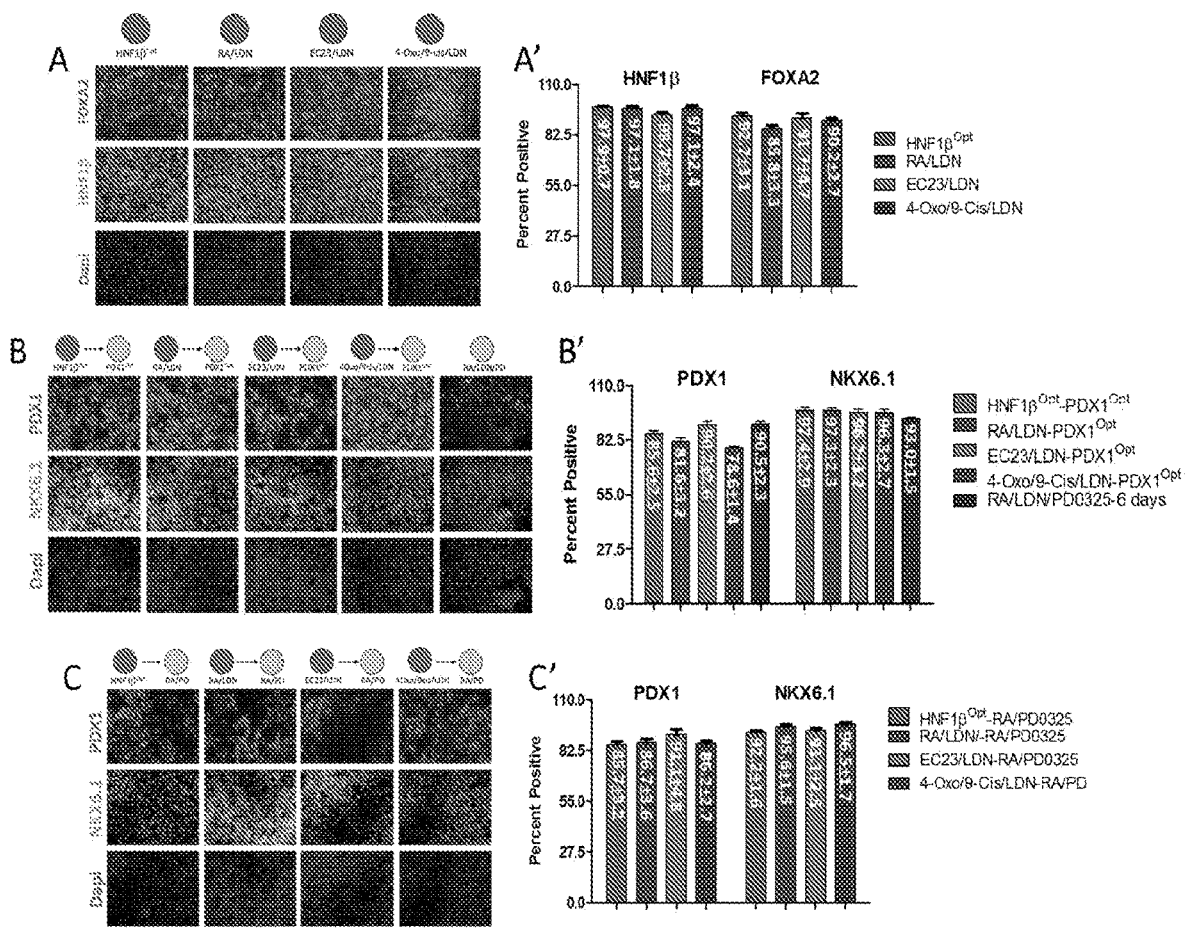
FIG. 18. Quantification of DFE protocols. A: Representative IHC from four different DFE protocols as described in the schematic above the images. A': Corresponding quantification of the different protocols from panel A. B: Representative IHC from the four different DFE protocols further differentiated towards pancreatic progenitors as detailed in the schematic above the images. B': Corresponding quantification of the different protocols from panel B. C: Representative IHC from the four different DFE protocols further differentiated towards pancreatic progenitors using only the critical process parameters as defined through differentiation models and detailed in the schematic above the images. C': Corresponding quantification of the different protocols from panel B.
Figure 19:
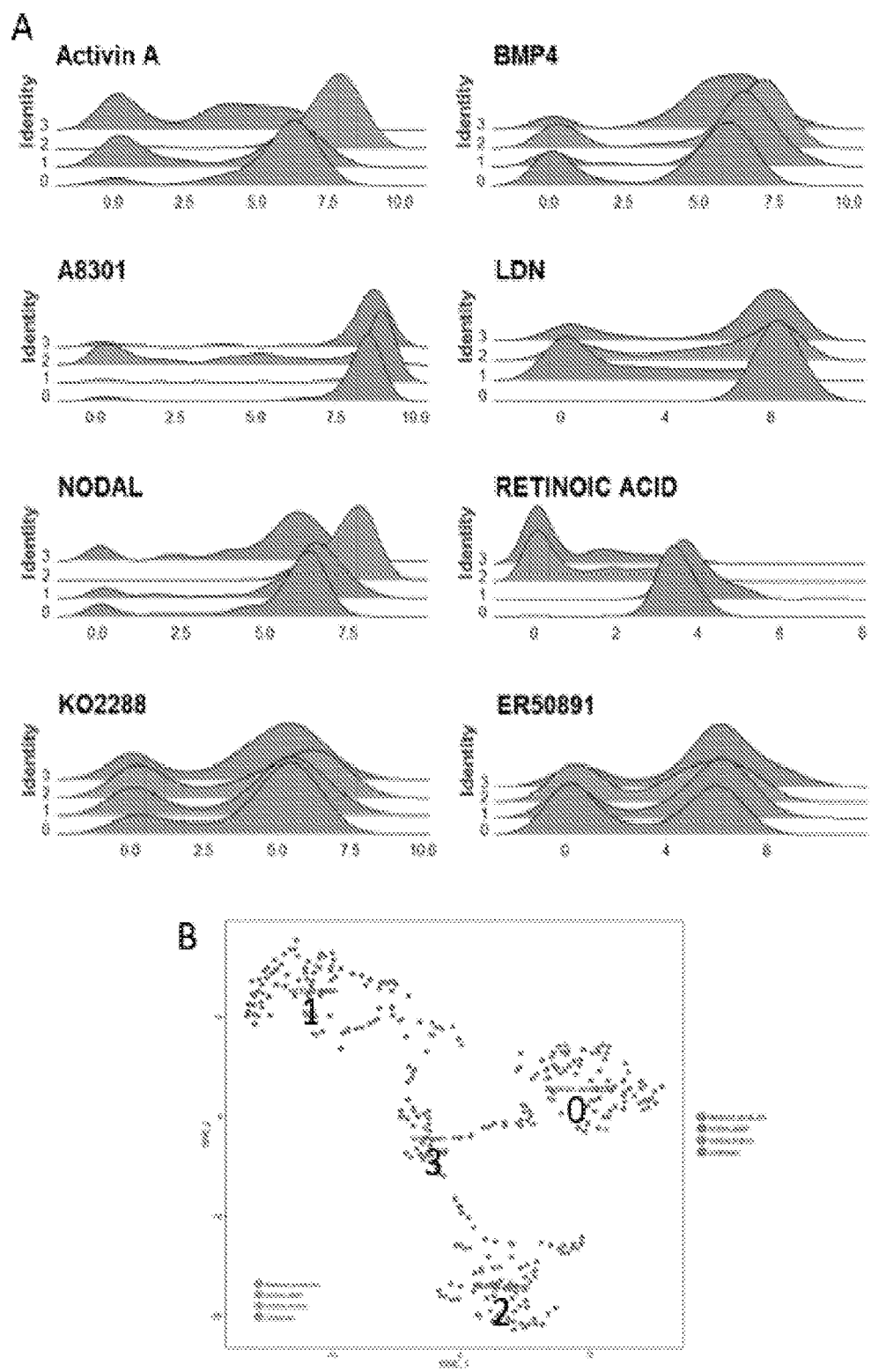
FIG. 19. Defining the relative effector contribution for the representative patterned endodermal populations. A: Ridge plots showing the relative levels of the different effectors used throughout the experiment. The different plots refer back to the optimizer clustering and are color matched to the different clusters. B: Original Cluster is shown again for ease in referencing with the corresponding cluster number (0-3) provided.

Evaluation of Important Process Parameters Related to Endodermal Induction and the Identification of Multiple Endodermal Fates Descending from Pluripotency, Based on Relative Inputs from Nodal, BMP and Retinoic Acid HD-DoE designs incorporating Activin A (AA), BMP4, NODAL, retinoic acid and respective inhibitors were used on pluripotent cultures and key endodermal genes were monitored (FIG. 16). Resulting data was imported into analysis software and computer models predicting optimal culture conditions for activating all genes monitored were clustered (FIG. 19B). Four distinct endodermal populations were predicted which all tolerate NODAL. The corresponding ridge plots (FIG. 19A) demonstrate that retinoic acid signaling contributes to the induction of the endodermal populations defined by cluster 0 and cluster 1 (red and green clusters respectively). Cluster 0 is the previously characterized dorsal foregut endoderm with the CPP of retinoic acid and BMP inhibition and cluster 1 is an anterior endodermal population described below that is generated and patterned through the combinatorial effects of Nodal, BMPs and retinoic acid. Only cluster 2 (blue cluster) was found to be dependent on AA, since the concentration of AA is highly variable in both cluster 1 and 3 (green cluster and purple cluster) and the Alk4/5/7 inhibitor A8301, which specifically targets AA signaling, is present in high levels in clusters 0, 1 and 3. A8301 is essentially absent in the proposed AA driven cluster 2 (blue cluster) allowing for uninhibited signaling. A similar pattern is observed for BMP4 signaling in which only cluster 1 (green cluster) has both high levels of BMP4 without the provision of a selective pathway inhibitor, in this case the absence of the ALK2/3 inhibitor LDN193189 (FIG. 19). The ALK1/2/6 inhibitor K02288 is tolerated within cluster 1 suggesting that BMP4 signaling occurs through the ALK3 receptor within this endodermal population. Nodal was shown to be present in all clusters with the two strongest contributions being cluster 2 (blue cluster) and cluster 1 (green cluster), respectively the proposed AA and BMP4 driven clusters. Suggesting that Nodal can signal through either the Smad 2/3 mediated AA pathway classically attributed to Nodal signaling and potentially plays a role in the Smad1/5/8 BMP driven signal transduction pathway that Nodal has more recently been shown to activate. Also considering that clusters 0 and 3 were both shown to have a significant contribution of the effectors AA, BMP4 and Nodal as well as their respective inhibitors implies that endodermal patterning may have a strong contribution from the non-canonical TGF-β signaling.

Example 5

Figure 20:
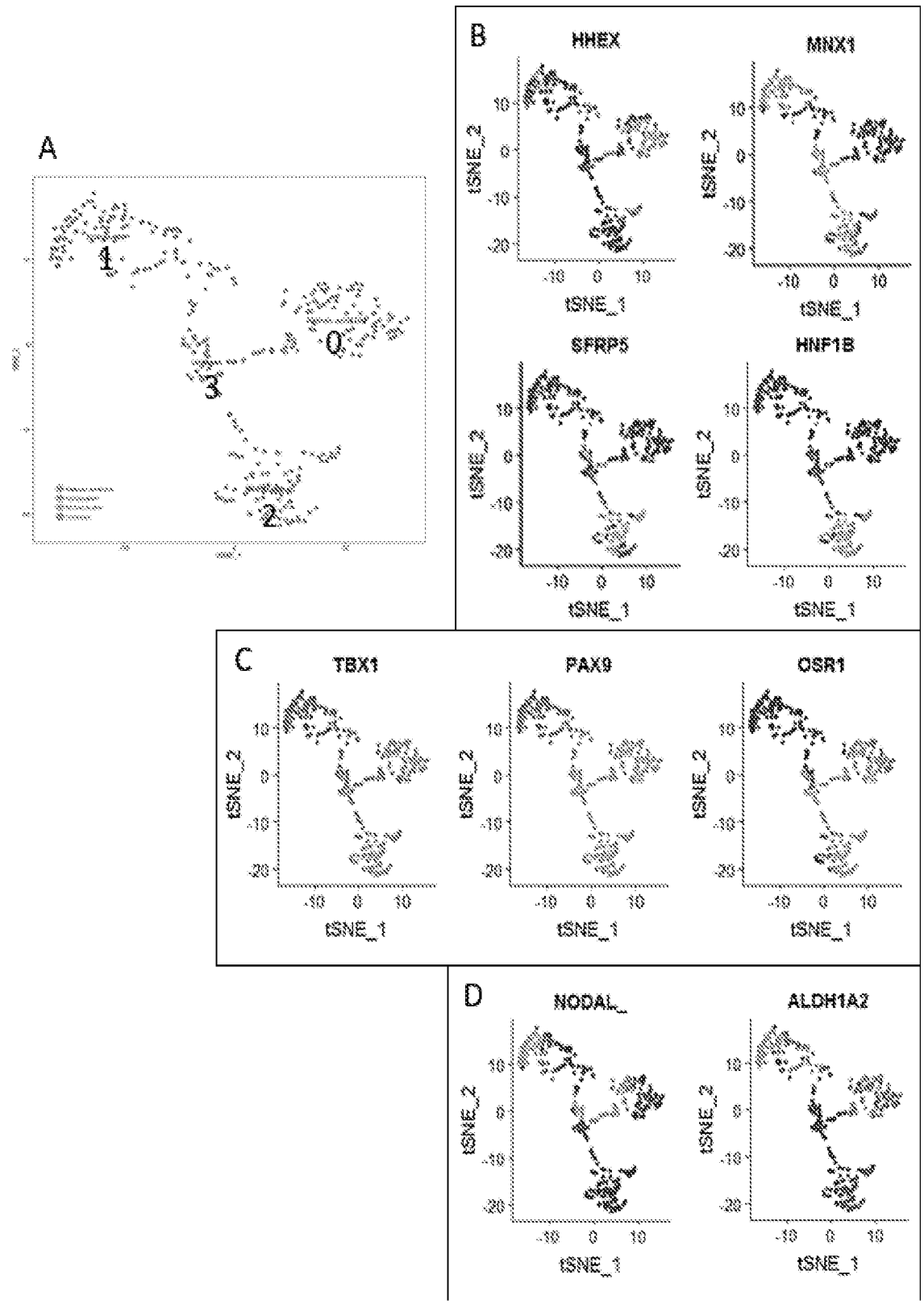
FIG. 20. Evaluating expression patterns within endodermal clusters. A: Original Cluster is shown again for ease in referencing with the corresponding cluster number (0-3) provided. B: Cluster 0 consists of dorsal foregut endoderm (DFE). C: Cluster 1 consists of anterior to midgut endodermal populations (ADE). D: Expression patterns of the primitive streak markers Nodal and ALDH1A2.
Figure 21:
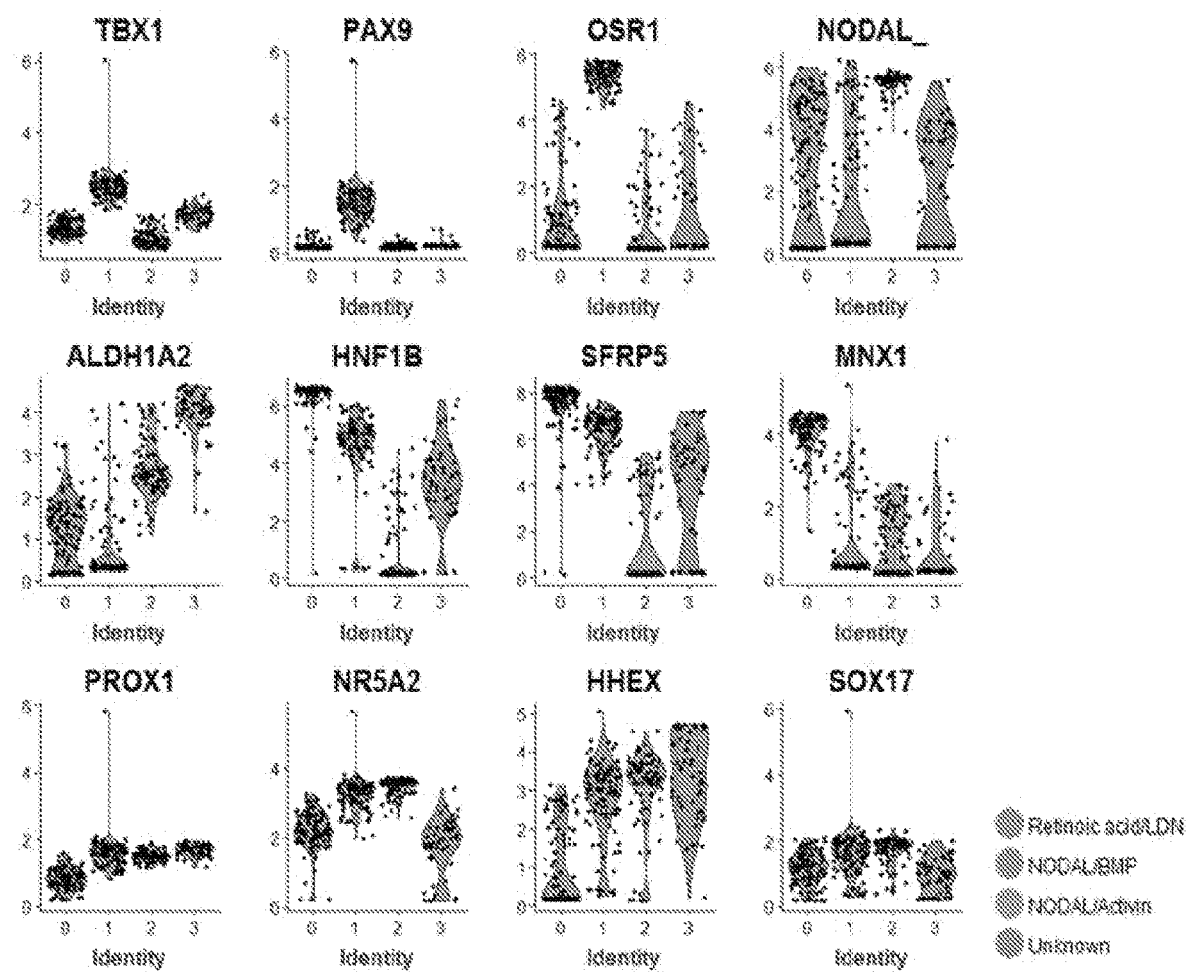
FIG. 21. Anterior and midgut genes are induced in the absence of AA. Violin plots defining the relative expression levels throughout the different clusters of select endodermal genes.

Identification of Anterior Domain Endodermal Population by Analysis of Regionally-Specific Genes We sought to further clarify the phenotype of the specific clusters identified in FIG. 16 and FIG. 19B. FIG. 20 reveals the location of specific genes within the four main clusters. First, we demonstrate that cluster 0 represents the previously identified DFE. As can be seen in FIG. 20B & FIG. 21 the ventral marker HHEX is largely absent and the dorsal marker MNX1 is exclusively expressed in cluster 0. SFRP5 and HNF1β both have broader expression beyond cluster 0 and are also present within cluster 1. This is because SFRP5 and HNF1β are not limited to the dorsal field of the gut tube but are also expressed along the entire anterior region and throughout the midgut. Cluster 1 represents a distinct endodermal population different from DFE and standard literature induced DE (which is represented by Cluster 2). Due to specific marker expression, we determined that cluster 1 represents an endodermal population representative of the anterior/midgut region of the gut tube due to the expression patterns of the anterior genes TBX1, PAX9 and OSR1 (FIG. 20C & FIG. 21). We here refer to this population as anterior domain endoderm (ADE). In development, both TBX1 and PAX9 are expressed in the anterior pharyngeal region and OSR1 is expressed throughout the pharyngeal and into the midgut (FIG. 20C & FIG. 21).

The important process inputs for the ADE is inspected by ridge plot analysis (FIG. 19A). The induction of ADE most depends on the provision of Nodal, BMP and ALK5 inhibition in the absence of BMP inhibition. It is tolerant to RA signaling input. This input set reveals a distinct BMP-dependency feature absent for the other types of endoderm. While the ridge plots show a clear contribution of retinoic acid and Nodal for the induction of the ADE (FIG. 19A) the RA generating enzyme ALDH1A2 is not expressed and Nodal has varied expression throughout cluster 1. The lack of ALDH1A2 is consistent of this population representing a more anterior field because retinoic acid production begins at mid-gastrulation more posteriorly. Thus, any involvement of patterning the anterior endoderm could be achieved through diffusion of the retinoid within the embryo. While the lack of Nodal expression may be due to the fact that the most anterior region of the primitive streak is believed to exit gastrulation first, implying that this population may have already exited a primitive streak phenotype but retains a responsiveness to Nodal. In conclusion, we define a novel endodermal type, and the inducing inputs underlying its generation.

Example 6

Figure 22:
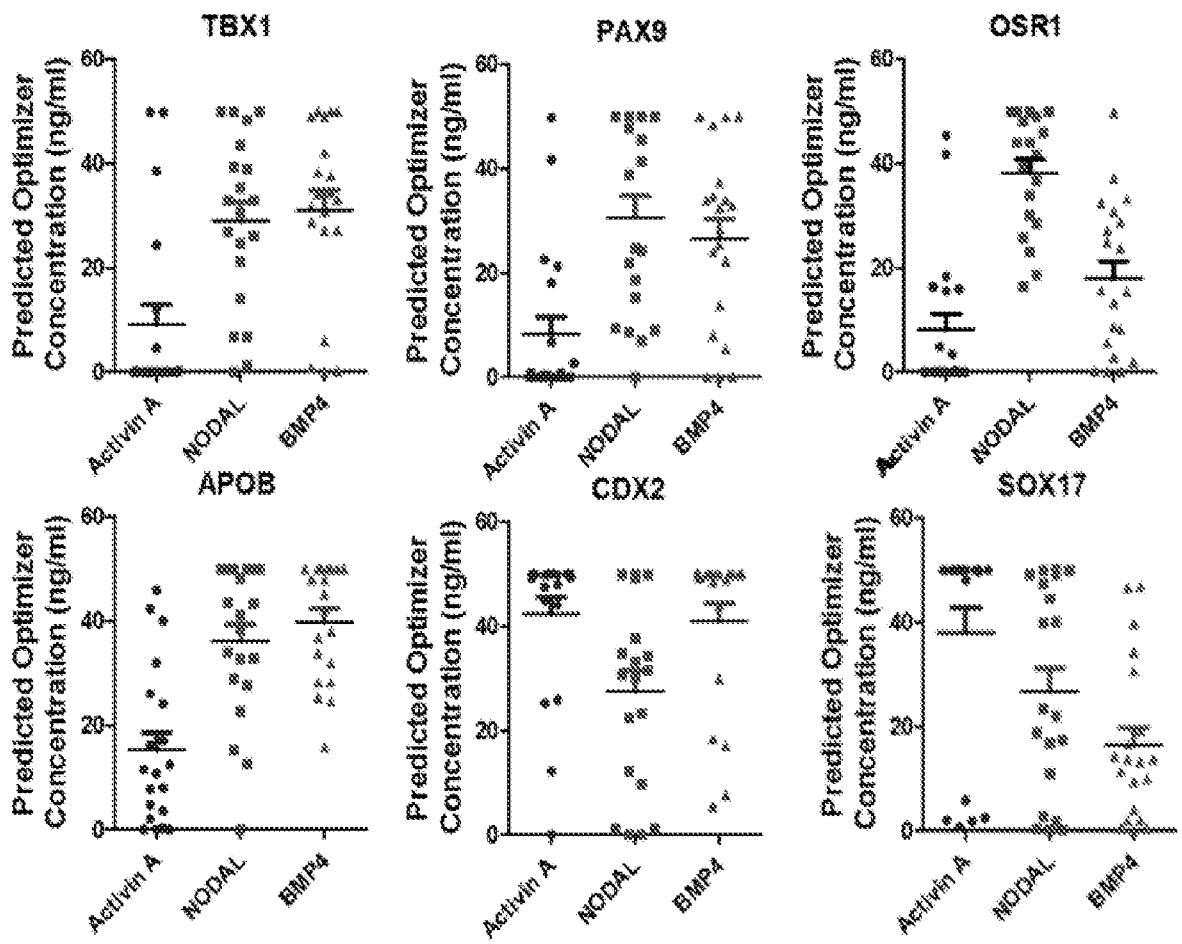
FIG. 22. Anterior endodermal genes are BMP4 and Nodal responsive. Twenty independent optimizers for each gene noted in the individual graphs are shown focusing on the predicted concentrations of the TGF β family ligands AA, Nodal and BMP4 involved in the activation of the respective genes.

Comparison of Important Process Parameters in Relation to Specific Endodermal Expressed Genes To gain a better understanding of the importance of Nodal and BMP4 signaling in the generation of anterior/mid-gut endodermal population we compiled all predictive models for the optimization of TBX1, PAX9 and OSR1 (FIG. 22). Both Nodal and BMP4 showed an equal average accumulative contribution for the activation of anterior endoderm as shown through TBX1 and PAX9 optimizers. Whereas the broader expressed OSR1 (anterior to midgut) showed a much stronger response to Nodal signaling, though BMP4 still had a significant contribution. This implies a decreasing BMP signaling contribution the more distal down the gut tube patterning occurs. It is important to note that AA had little to no contribution in inducing TBX1, PAX9 or OSR1 (FIG. 22) as all previous efforts in generating pharyngeal or gastric descendants relied on the initial use of AA. In turn it was noted that AA had an increased effector contribution in select genes representative of the midgut, posterior and ventral endodermal fates as shown through the selected example optimizers for APOB, CDX2 and SOX17 respectively (FIG. 22). This demonstrates the AA input usually encountered in literature serves to create a more posterior endodermal field.

Figure 23:
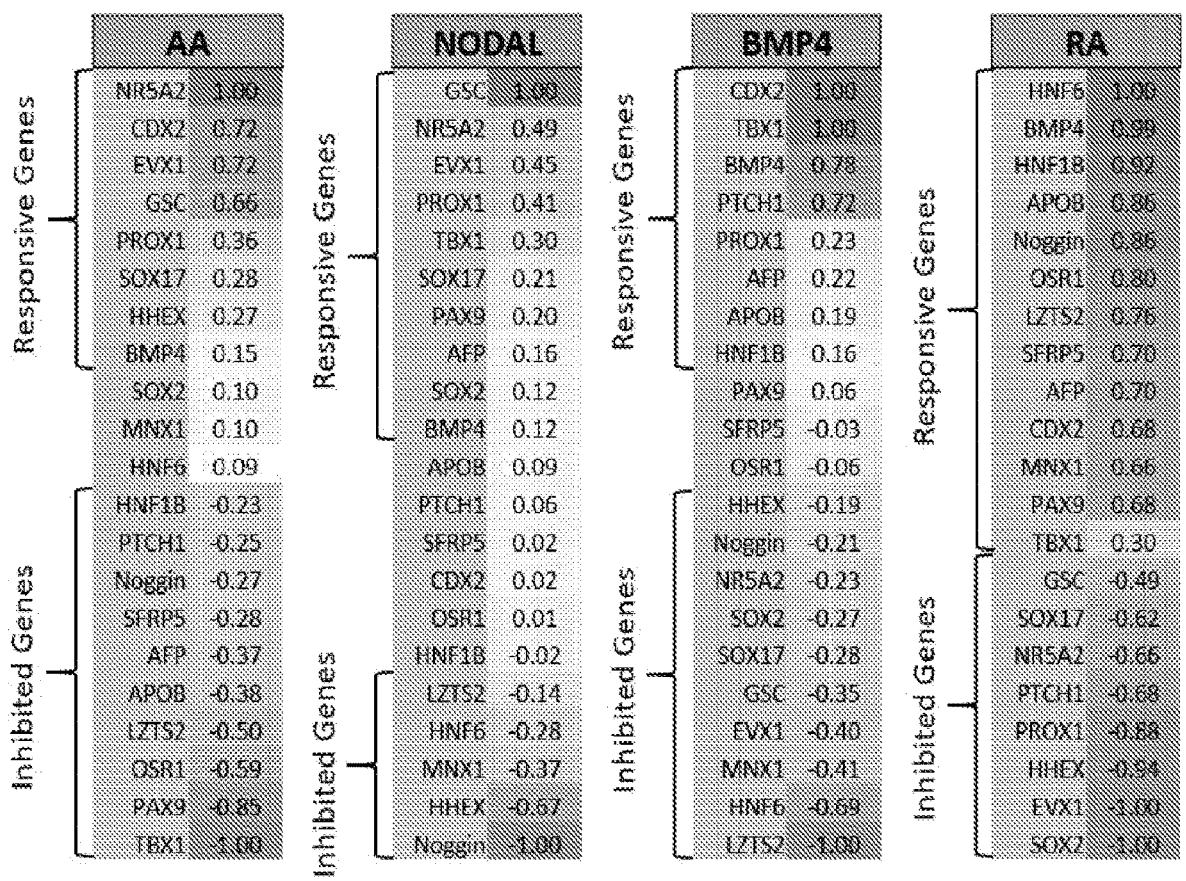
FIG. 23. AA, BMP, Nodal and retinoic acid all have uniquely responsive gene networks. Effector factor contributions from all respective optimizers for the endodermal genes measured were normalized and ranked ordered from most responsive to least responsive genes.

To directly define which of the endodermal genes measured were responsive to the respective TGFβ agonist we next performed ISPA on all of the key endodermal genes measured which could define discrete regions along the gut tube. The respective effector factor contributions were then normalized and ranked ordered from most responsive to least responsive genes for AA, Nodal, BMP4 and RA (FIG. 23). Our previous finding that RA has central role in the generation of DFE was again verified as HNF6, HNF1 β, SFRP5 and MNX1 were all shown to be highly regulated by RA and inhibited by AA (FIG. 23). Consistent with the conditions for generating ADE, Nodal, BMP4 and RA are all shown to be involved in the activation of TBX1, PAX9 and OSR1 with a highly negative contribution from AA, −0.59, −0.85 and −1.0 normalized factor contributions respectively. In agreement with the current hypothesis that AA and Nodal have redundant functions a number genes with overlapping input logics were observed between the two effectors. These included the primitive streak genes GSC and NODAL (NODAL not shown in FIG. 23, but is shown in FIG. 21), the midgut genes NR5A2, CDX2 and PROX1, and ventrally localized genes BMP4 and SOX17.

Figure 24:
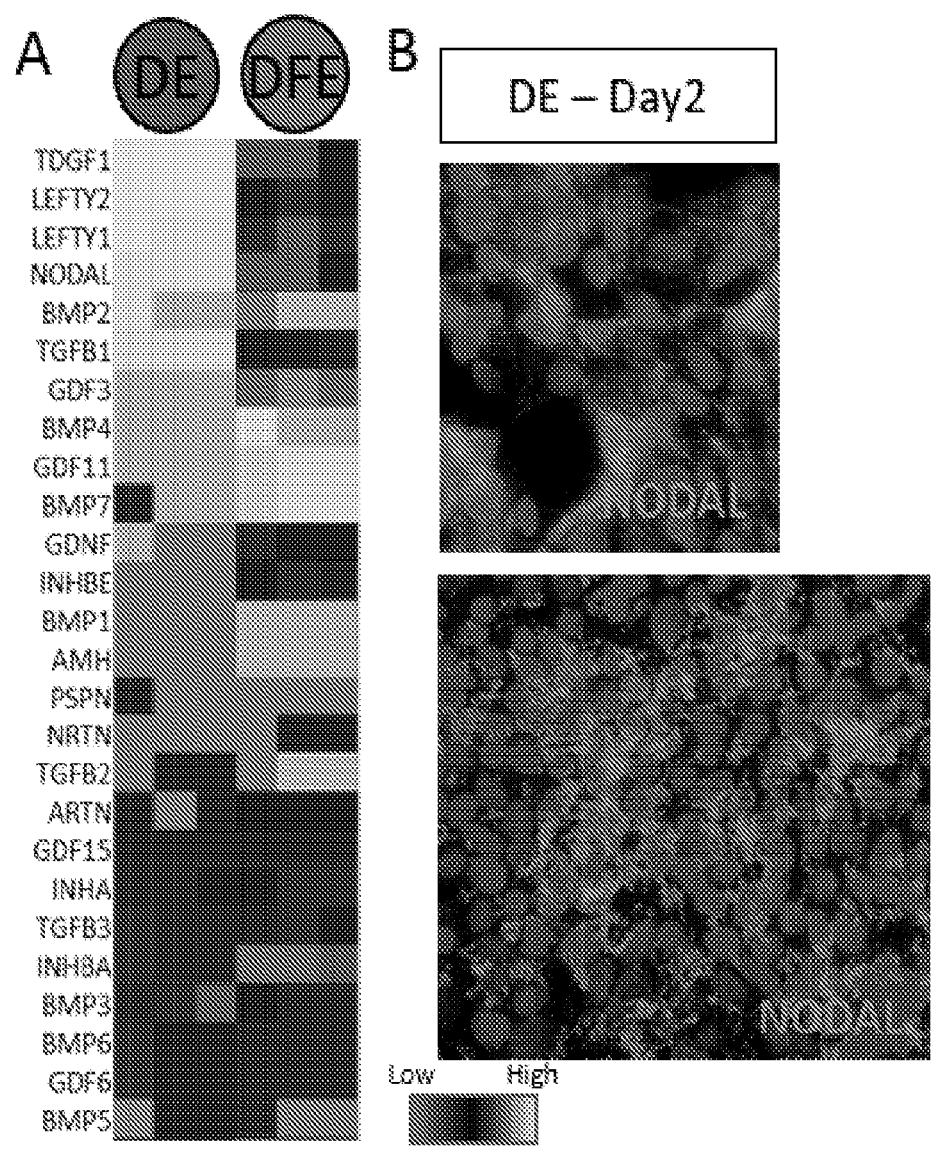
FIG. 24. AA stimulated pluripotent cells activate several TGF β family ligands. A: RNA Seq data was used to determine the expression patterns of TGFβ family ligands activated in both the DE and the DFE conditions. Genes were ranked ordered from greatest to least transcripts within the DE population and undetected levels were removed from the heatmap. B: IHC confirming the expression of Nodal in AA stimulated pluripotent cells.
Figure 25:
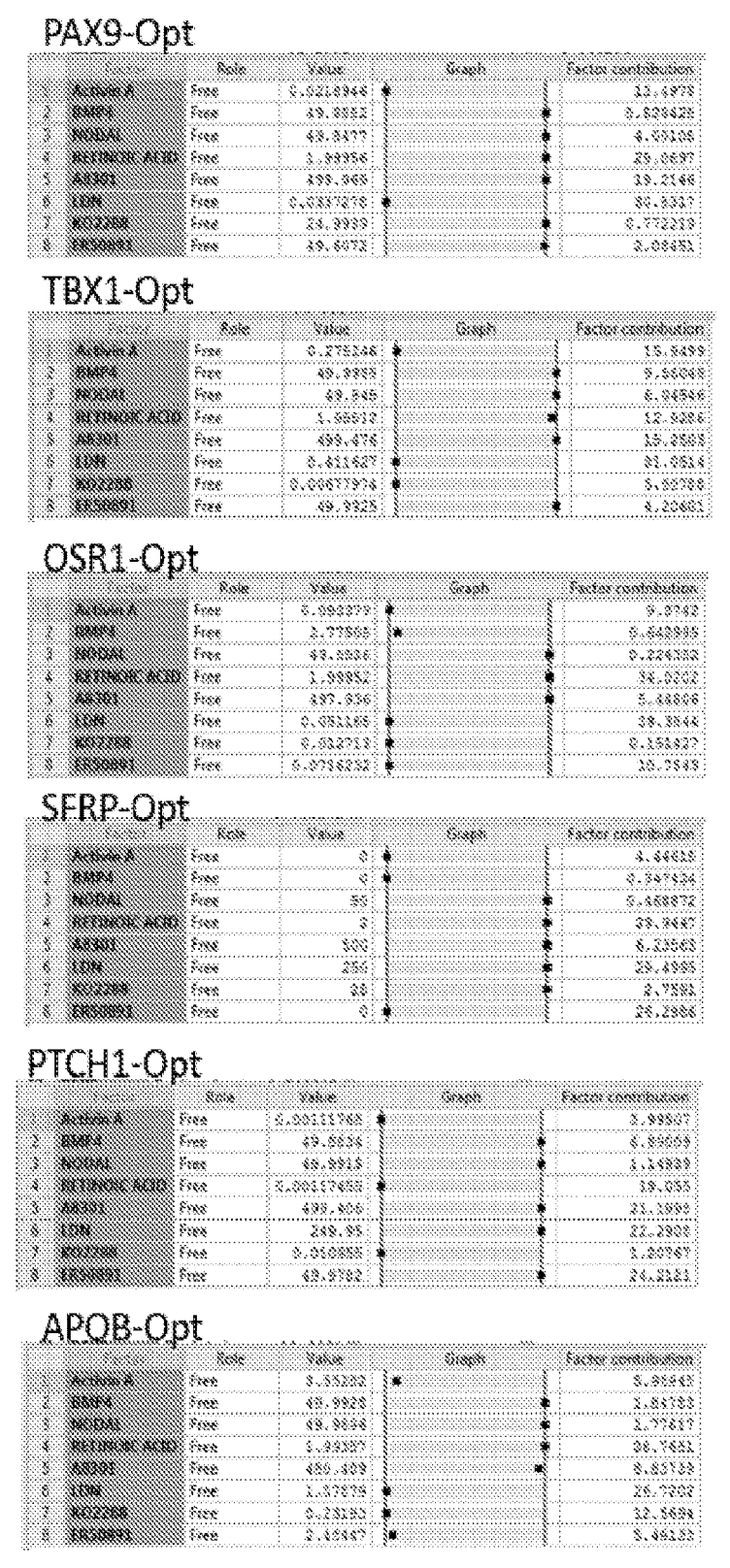

Since it is shown that both BMP4 and NODAL are activated by AA we next used RNA Seq data to evaluate which TGF β family ligands are activated in both the classical DE and the novel DFE protocols. Incubation of pluripotent cultures with AA was shown to induce the endogenous expression of several TGF β family members including TDGF1, LEFTY1/2, NODAL, BMP1/2/4/7, and TGF β1 possibly explaining previous findings attributing a broader effect for AA endoderm induction (FIG. 24A). This induction of high levels of Nodal through the generation of DE was confirmed through IHC based protein detection (FIG. 24B). Whereas RA/LDN treatment of pluripotent cells resulted in the selective activation of BMP1/2/4/7, GDF11, AMH and TGF β2 (FIG. 24). This retinoic acid-mediated BMP induction explains the criticality of LDN in the dorsalization of the DFE protocol. Altogether, we demonstrate that NODAL and BMP patterns endoderm along the anterior to mid gut tube and AA responsive genes are more representative of primitive streak, ventral midgut and more posterior regions. Optimizers for the selective activation of several Nodal/BMP/RA responsive genes that are un-responsive to AA are given as examples in FIG. 25.

REFERENCES

ADEWOLA, et la., Biomed Microdevices, 2010, 12, 409-17.
AFELIK et al., Development, 2012, 139, 1744-53.
ANGELO et al., 2012, PLoS One, 7, e40707.
BODY-BECHOU, et al., 2014, Prenat Diagn, 34, 90-3.
BORT, et al., 2004, Development, 131, 797-806.
CARINHAS et al., 2012, Trends Biotechnol, 30, 377-85.
CHAKRABARTY et al., 2013, Wiley Interdiscip Rev Syst Biol Med, 5, 181-203.
CHEN, et al., 2013, Development, 140, 675-86.
CHUNG, et al., 2008, Dev Cell, 15, 738-48.
D'AMOUR, et al., 2005, Nat Biotechnol, 23, 1534-41.
DAVENPORT et al., 2016, Stem Cells, 34, 2635-2647.
DE VAS, et al., 2015, Development, 142, 871-82.
DEUTSCH, et al., 2001, Development, 128, 871-81.
GADUE, et al., 2006, Proc Natl Acad Sci USA, 103, 16806-11.
GERIN, et al., 2014, BMC Syst Biol, 8, 96.
GREEN, et al., 2011, Nat Biotechnol, 29, 267-72.
HAUMAITRE, et al., 2005, Proc Natl Acad Sci USA, 102, 1490-5.
HEBROK, et al., 1998, Genes Dev, 12, 1705-13.
HRVATIN, et al., 2014, Proc Natl Acad Sci USA, 111, 3038-43.
JENNINGS, et al., 2017, Stem Cell Reports, 9, 1387-1394.
JENSEN, et al., 2000, Diabetes, 49, 163-76.
KITANO, H. 2002. Computational systems biology. Nature, 420, 206-10.
KROON, et al., 2008, Nat Biotechnol, 26, 443-52.
KUMAR, et al., 2003, Dev Biol, 259, 109-22.
KUMAR, et al., 2014, Biotechnol Prog, 30, 86-99.
KWON, et al., 1999, Dev Cell, 15, 509-20.
LI, et al., 1999, Nat Genet, 23, 67-70.
LOH, et al., 2014, Cell Stem Cell, 14, 237-52.
MARTIN, et al., 2005, Dev Biol, 284, 399-411.
MATSUNO, et al., 2016, Differentiation, 92, 281-290.
MATSUURA, et al., 2009, Mech Dev, 126, 817-27.
MCCRACKEN, et al., 2014, Nature, 516, 400-4.
MCDONALD, et al., 2014, Nat Cell Biol, 16, 1128-9.
MENDES, et al., 2016, Tissue Eng Part C Methods, 22, 473-86.
MERCIER, et al., 2013, J Biotechnol, 167, 262-70.
MFOPOU, et al., Gastroenterology, 138, 2233-45, 2245 e1-14.
MOLOTKOV, et al., 2005, Dev Dyn, 232, 950-7.
PAGLIUCA, et al., 2014, Cell, 159, 428-39.
POLL, et al., 2006, Diabetes, 55, 61-9.
RATHORE, et al., 2014, Biotechnol Prog, 30, 967-73.
REZANIA, et al., 2014, Nat Biotechnol, 32, 1121-33.
ROOST, et al., 2015, Stem Cell Reports, 4, 1112-24.
ROTTINGER, et al., 2015, *Ptychodera flava*. Biol Open, 4, 830-42.
SADOWSKI et al., 2016, Trends Biotechnol, 34, 214-227.
SAMPAZIOTIS, et al., 2015, Nat Biotechnol, 33, 845-852.
SPENCE, et al., 2009, Dev Cell, 17, 62-74.
SPENCE, et al., 2011, Nature, 470, 105-9.
SWAIN, et al., 2018, Curr Drug Discov Technol.
TREMBLAY, et al., 2005, Dev Biol, 280, 87-99.
ULVEN, et al., 2000, Dev Biol, 220, 379-91.
WANG, et al., 2012, Biomed Microdevices, 14, 419-26.

All publications and patents mentioned in the specification and/or listed below are herein incorporated by reference. Various modifications and variations of the described method and system of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the relevant fields are intended to be within the scope described herein.

We claim:

1. A method of generating pancreatic endoderm cells having dorsal pancreatic identity comprising:
    a) contacting a population of pluripotent stem cells with a retinoic acid signaling pathway agonist and a bone morphogenetic (BMP) pathway inhibitor;
    b) culturing at least a portion of said population of pluripotent stem cells such that a population of dorsal foregut endoderm (DFE) cells is generated;
    wherein said stem cells are not exposed to a transforming growth factor beta (TGFB) pathway agonist during said culturing in b) or during said contacting in a);
    c) contacting at least a portion of said population of DFE cells with a retinoic acid signaling pathway agonist and a FGFR pathway inhibitor; and
    d) culturing a least a portion of said population of DFE cells such that a population of pancreatic endoderm (PE) cells having dorsal pancreatic identity is generated; and
    wherein said PE cell are not exposed to a TGFB pathway agonist during said culturing in step d) or during said contacting in step c).

2. The method of claim 1, wherein said BMP pathway inhibitor is a BMP4 pathway inhibitor.

3. The method of claim 1, wherein said BMP pathway inhibitor comprises LDN193189.

4. The method of claim 1, wherein said BMP pathway inhibitor is selected from the group consisting of: DMH1, DMH2, Dorsomorphin, K02288, LDN214117, ML347, and Noggin.

5. The method of claim 1, wherein said retinoic acid signaling pathway agonist is selected from the group consisting of: i) a retinoid compound, ii) a retinoid X receptor (RXR) agonist, and iii) a retinoic acid receptor (RARs) agonist.

6. The method of claim 1, wherein said retinoic acid signaling pathway agonist is selected from the group consisting of: retinoic acid, Sr11237, adapalene, EC23, 9-cis retinoic acid, 13-cis retinoic acid, 4-oxo retinoic acid, and All-trans Retinoic Acid (ATRA).

7. The method of claim 1, wherein said culturing in b) is conducted for 1-5 days or 2-4 days or 5-15 days.

8. The method of claim 1, wherein said culturing in step d) is conducted for 1-5 days or 2-4 days or 5-15 days.

9. The method of claim 1, wherein said FGFR pathway inhibitor is selected from the group consisting of: PD0325901, Arctigenin, PD184352, PD198306, PD334581, SL 327, U0126, a MEK inhibitor, a FGFR inhibitor, a MAPK inhibitor, MEK162, GSK1120212, PD325901, CI-1040, TAK-733, Selumetinib and XL518.

10. The method of claim 1, wherein said contacting in step c) further comprises contacting said population of DFE cells with a sonic hedgehog (SHH) pathway inhibitor.

11. The method of claim 1, further comprising:
e) contacting at least a portion of said population of PE cells with a Notch pathway inhibitor and an ALK5 inhibitor; and
f) culturing a least a portion of said population of PE cells such that a population of endocrine cells are generated.

12. The method of claim 11, wherein said endocrine cells are insulin-expressing cells.

13. The method of claim 11, wherein said endocrine cells are fetal-type β cells.

14. A method of generating pancreatic endoderm cells having dorsal pancreatic identity comprising:
a) contacting a population of pluripotent stem cells with a retinoic acid agonist and a bone morphogenetic (BMP) inhibitor; and
b) culturing at least a portion of said population of pluripotent stem cells such that a population of dorsal foregut endoderm (DFE) cells is generated;
wherein said stem cells are not exposed to a transforming growth factor beta (TGFB) agonist during said culturing in b) or during said contacting in a);
c) contacting at least a portion of said population of DFE cells with a retinoic acid signaling agonist and a FGFR inhibitor; and
d) culturing a least a portion of said population of DFE cells such that a population of pancreatic endoderm (PE) cells having dorsal pancreatic identity is generated; and
wherein said PE cell are not exposed to a TGFß agonist during said culturing in step d) or during said contacting in step c).

15. The method of claim 14, wherein said BMP inhibitor is a BMP4 inhibitor.

16. The method of claim 14, wherein said BMP inhibitor comprises LDN193189.

17. The method of claim 14, wherein said BMP inhibitor is selected from the group consisting of: DMH1, DMH2, Dorsomorphin, K02288, LDN214117, ML347, and Noggin.

18. The method of claim 14, wherein said retinoic acid agonist is selected from the group consisting of: i) a retinoid compound, ii) a retinoid X receptor (RXR) agonist, and iii) a retinoic acid receptor (RARs) agonist.

19. The method of claim 14, wherein said retinoic acid agonist is selected from the group consisting of: retinoic acid, Sr11237, adapalene, EC23, 9-cis retinoic acid, 13-cis retinoic acid, 4-oxo retinoic acid, and All-trans Retinoic Acid (ATRA).

20. The method of claim 14, wherein said culturing in b) is conducted for 1-5 days or 2-4 days or 5-15 days.

* * * * *